(12) United States Patent
Wang et al.

(10) Patent No.: US 10,157,167 B2
(45) Date of Patent: Dec. 18, 2018

(54) METHOD FOR DETERMINING TRIAXIAL CONDUCTIVITY WITH ARBITRARY ORIENTATION USING MULTIAXIAL ELECTROMAGNETIC MEASUREMENTS

(71) Applicant: Schlumberger Technology Corporation, Sugar Land, TX (US)

(72) Inventors: Gong Li Wang, Sugar Land, TX (US); Keli Sun, Sugar Land, TX (US); Aria Abubakar, Sugar Land, TX (US); Thomas D. Barber, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 541 days.

(21) Appl. No.: 14/975,620

(22) Filed: Dec. 18, 2015

(65) Prior Publication Data
US 2016/0230511 A1  Aug. 11, 2016

Related U.S. Application Data

(60) Provisional application No. 62/094,779, filed on Dec. 19, 2014.

(51) Int. Cl.
*E21B 43/26* (2006.01)
*G06F 17/16* (2006.01)
(Continued)

(52) U.S. Cl.
CPC ............ *G06F 17/16* (2013.01); *E21B 43/26* (2013.01); *G01V 3/28* (2013.01); *G01V 3/38* (2013.01); *G01V 99/005* (2013.01)

(58) Field of Classification Search
CPC .......... G06F 17/16; E21B 43/25; E21B 43/26; G01V 3/28; G01V 3/38; G01V 99/005
See application file for complete search history.

(56) References Cited

U.S. PATENT DOCUMENTS 3,014,177 A    12/1961  Hungerford et al.
6,798,208 B2*   9/2004  Omeragic ............. G01V 3/28
                                                 324/338
(Continued)

FOREIGN PATENT DOCUMENTS

WO    2011123379 A1   10/2011
WO    2013191749 A1   12/2013

OTHER PUBLICATIONS

Jia et al. "Inversion for Tilted Triaxial Conductivity in Dipping Layered Formations," Antennas and Propagation & USNC/URSI National Radio Science Meeting, IEEE Int'l Symposium, Jul. 19-24, 2015, pp. 904-905.
(Continued)

*Primary Examiner* — Yong-Suk Ro
(74) *Attorney, Agent, or Firm* — Michael Dae

(57) ABSTRACT

A system and method discloses performing a fracture operation at a wellsite about a subterranean formation. The method involves, obtaining wellsite measurements by placing a downhole tool in a wellbore and using the downhole tool to acquire measurements of the subterranean formation, simulating the obtained wellsite measurements to determine formation parameters comprising conductivity tensors based on a formation model of the measured subterranean formation, validating the formation model by comparing the obtained wellsite measurements with the simulated wellsite measurements, generating fracture parameters and triaxiality indicators based on the validated formation model, and fracturing the subterranean formation based on the generated fracture parameters and triaxiality indicators.

19 Claims, 8 Drawing Sheets

(51) Int. Cl.
*G01V 99/00* (2009.01)
*G01V 3/38* (2006.01)
*G01V 3/28* (2006.01)

(56) References Cited

U.S. PATENT DOCUMENTS

| | | | |
|---|---|---|---|
| 6,798,708 | B2 | 9/2004 | Niwa et al. |
| 6,819,110 | B2 | 11/2004 | Omeragic et al. |
| 6,924,646 | B2 | 8/2005 | Omeragic |
| 6,977,021 | B2 | 12/2005 | Annacchino |
| 7,386,430 | B2 | 6/2008 | Barber et al. |
| 8,638,103 | B2 | 1/2014 | Rosthal et al. |
| 8,760,644 | B2 | 6/2014 | Seckar |
| 9,606,257 | B2 * | 3/2017 | Wu ............ G01V 3/28 |
| 2004/0108853 | A1 * | 6/2004 | Rosthal ............ G01V 3/28 324/343 |
| 2005/0256645 | A1 | 11/2005 | Rabinovich et al. |
| 2008/0215243 | A1 | 9/2008 | Rabinovich et al. |
| 2010/0230095 | A1 | 9/2010 | Yin |
| 2010/0256964 | A1 | 10/2010 | Lee et al. |
| 2011/0254552 | A1 * | 10/2011 | Wu ............ G01V 3/28 324/339 |
| 2012/0065889 | A1 | 3/2012 | Wu et al. |
| 2013/0335092 | A1 | 12/2013 | Wu |
| 2014/0078288 | A1 * | 3/2014 | Wu ............ E21B 43/26 348/85 |
| 2014/0305692 | A1 | 10/2014 | Hochstetler et al. |
| 2016/0124108 | A1 * | 5/2016 | Wu ............ G01V 3/38 702/7 |

OTHER PUBLICATIONS

Barber et al. "Determining Formation Resistivity Anisotropy in the Presence of Invasion," SPE 90526, presented at the SPE Annual Technical Conference and Exhibition, Houston, Texas, Sep. 26-29, 2004, pp. 1-25.

Davydycheva et al. "An Efficient Finite-Difference Scheme for Electromagnetic Logging in 3D Anisotropic Inhomogeneous Media," Geophysics, vol. 68, No. 5, 2003, pp. 1525-1536.

Habashy, et al. "A Generalized Material Averaging Formulation for Modelling of Electromagnetic Fields," J. of Electromagn. Waves and Appl., vol. 21, No. 9, pp. 1145-1159, 2007.

Kriegshäuser et al., "A New Multicomponent Induction Logging Tool to Resolve Anisotropic Formations," SPWLA 41st Annual Logging Symposium, Jun. 4-7, 2000, Paper D, pp. 1-14.

Moskow et al."A Finite Difference Scheme for Elliptic Equations with Rough Coefficients Using a Cartesian Grid Nonconforming to Interfaces," SIAM Journal of Numerical Analysis, vol. 36, No. 2,pp. 442-464, 1999.

Rosthal et al. "Field Test Results of an Experimental Fully-Triaxial Induction Tool," Transactions of the SPWLA 44th Annual Logging Symposium, Paper QQ, Jun. 22-25, 2003, pp. 1-14.

Sævik et al. "Electrical Conductivity of Fractured Media: A Computational Study of the Self-Consistent Method," presented at SEG International Exposition and 82th Annual Meeting, Las Vegas, Nevada, Nov. 4-9, 2012, pp. 1-5.

Torquato "Random Heterogeneous Media: Microstructure and Improved Bounds on Effective Properties," Appl. Mech. Rev. vol. 44, No. 2, 1991, pp. 37-76.

Hou et al., "Real-time Borehole Correction for a New Multi-Component Array Induction Logging Tool in OBM Wells," Transactions of the SWPLA 42th Annual Logging Symposium, Paper PPP, Jun. 16-20, 2012, pp. 1-16.

Wang et al. "Triaxial Induction Tool Response in Dipping and Crossbedded Formations", presented at SEG International Exposition and 84th Annual Meeting, Denver, Colorado, Oct. 26-31, 2014, pp. 585-590.

Wang, et al. "Determining Anisotropic Formation Resistivity at Any Relative Dip Using a Multiarray Triaxial Induction Tool," Annual Technical Conference and Exhibition, Society of Petroleum Engineers, SPE-103113-MS, 2006, pp. 1-13.

Wang et al. "Fracture Detection Using the Conductivity Triaxiality Index," SPE 175111-MS, SPE Annual Technical Conference and Exhibition, Sep. 28-30, Houston, Texas, USA, Sep. 28-30, 2015, pp. 1-21.

Zhang, G. J., G. L. Wang, and H. M. Wang, 1999, Application of Novel Basis Functions in a Hybrid Method Simulation of the Response of Induction Logging in Axisymmetrical Stratified Media : Radio Science, 34, No. 1, 19-26, 1999.

Habashy and Abubakar, 2004, A General Framework for Constraint Minimization for the Inversion of Electromagnetic Measurements, Progress in Electromagnetics Research, PIER 46, 265-312, 2004.

* cited by examiner

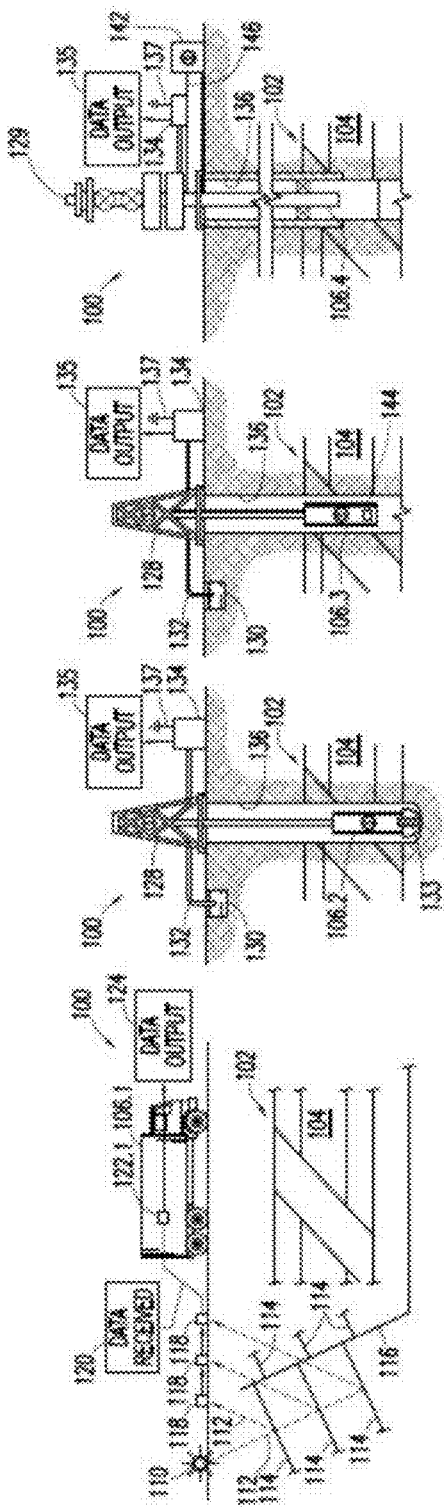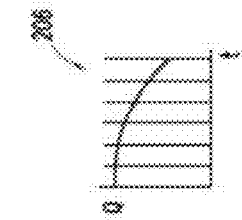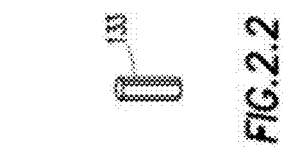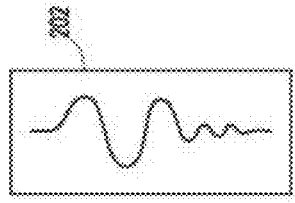

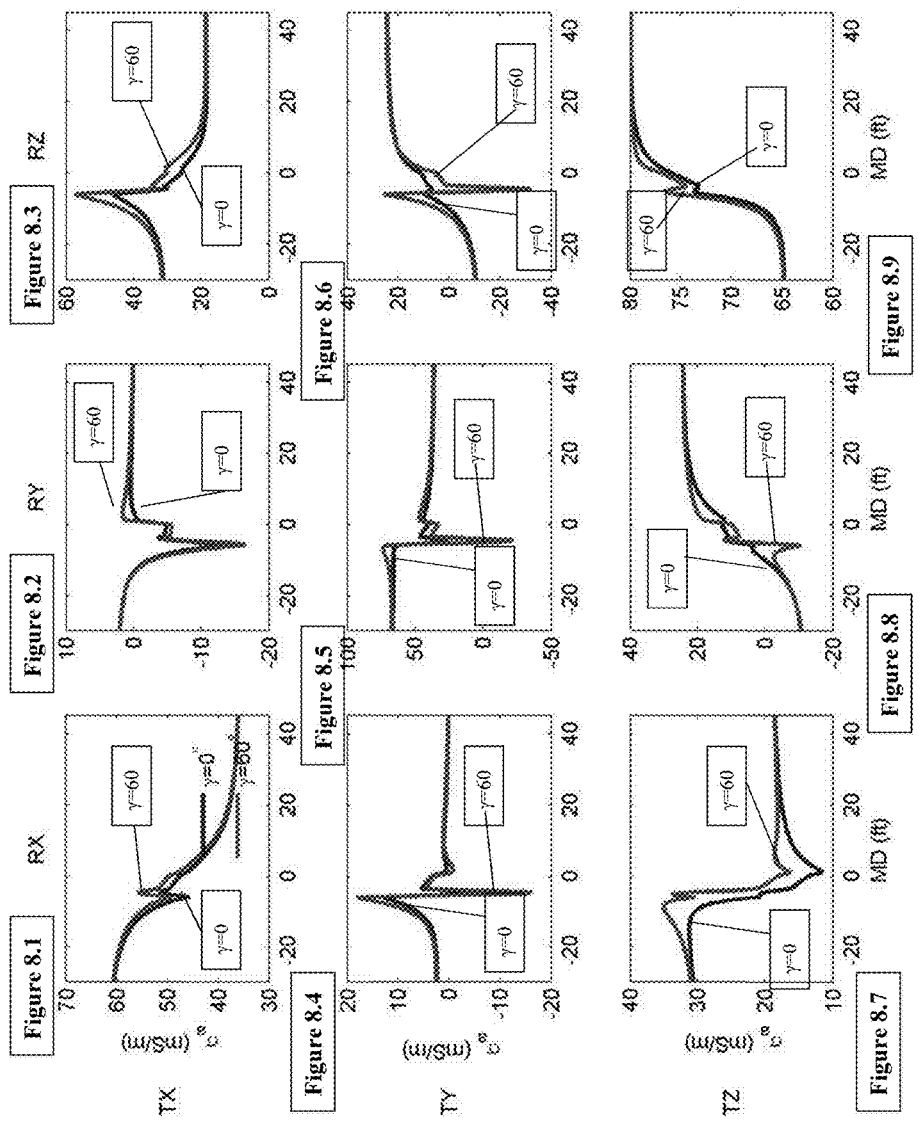

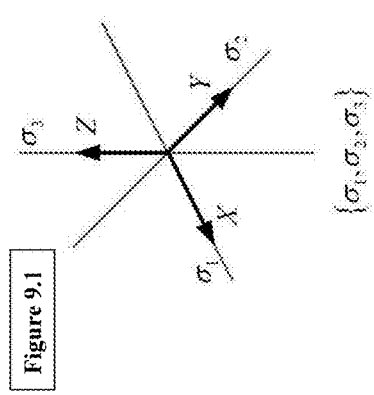
Figure 9.1
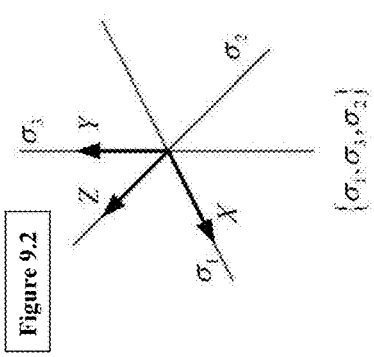
Figure 9.2
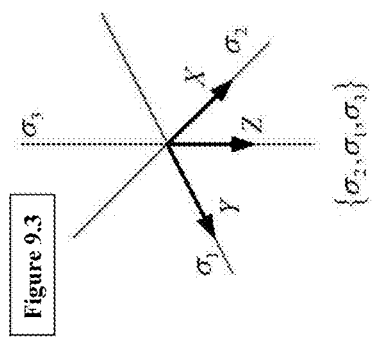
Figure 9.3
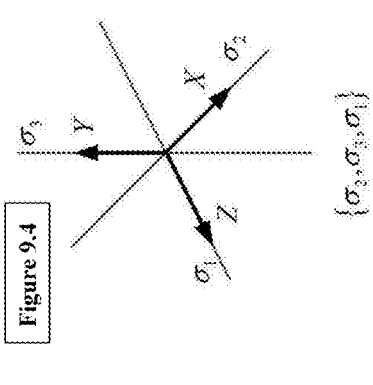
Figure 9.4
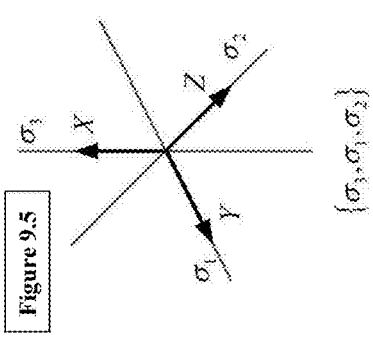
Figure 9.5
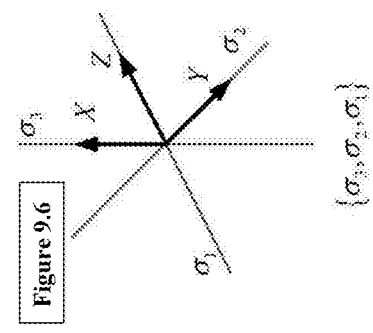
Figure 9.6

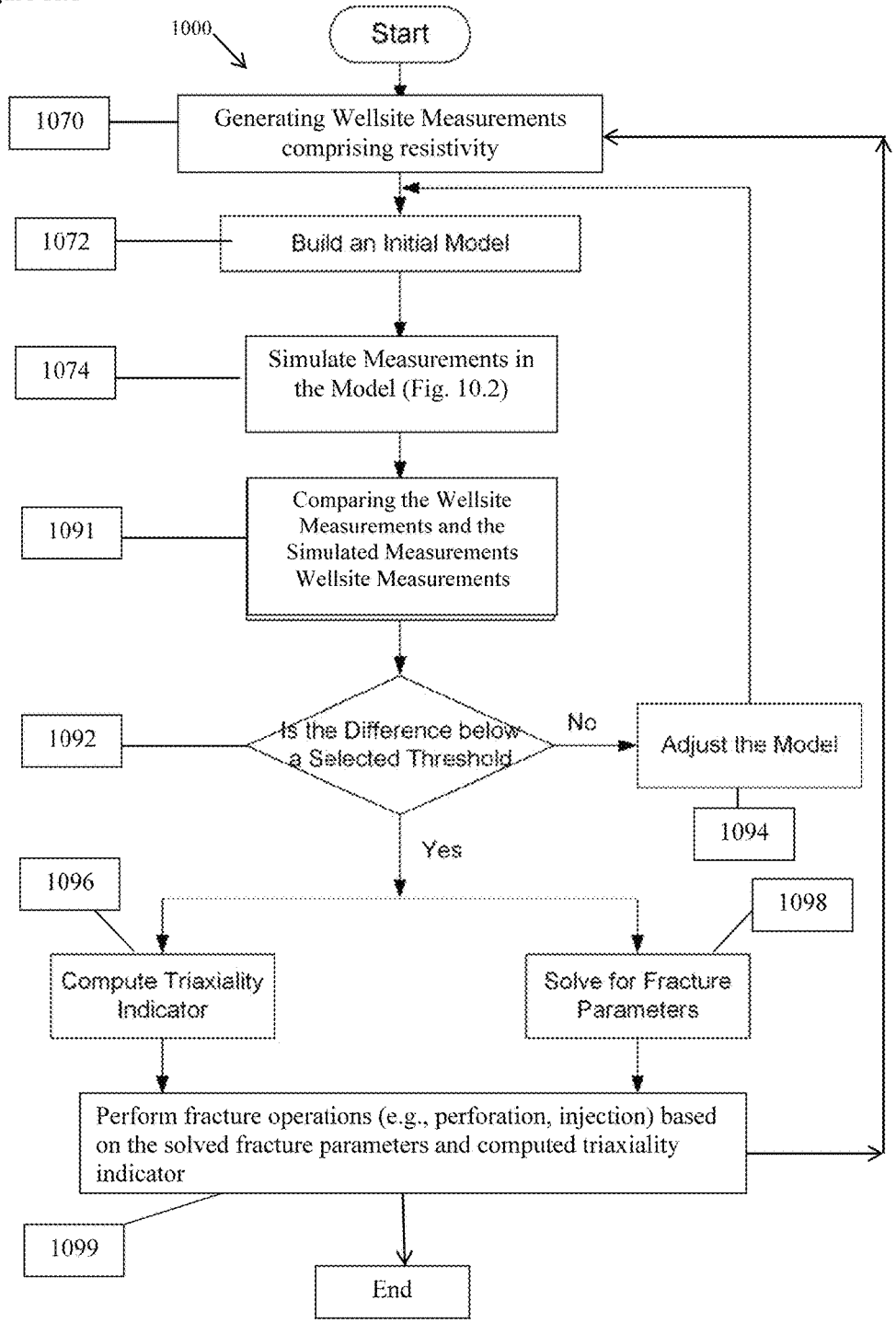
Figure 10.1

Figure 10.2
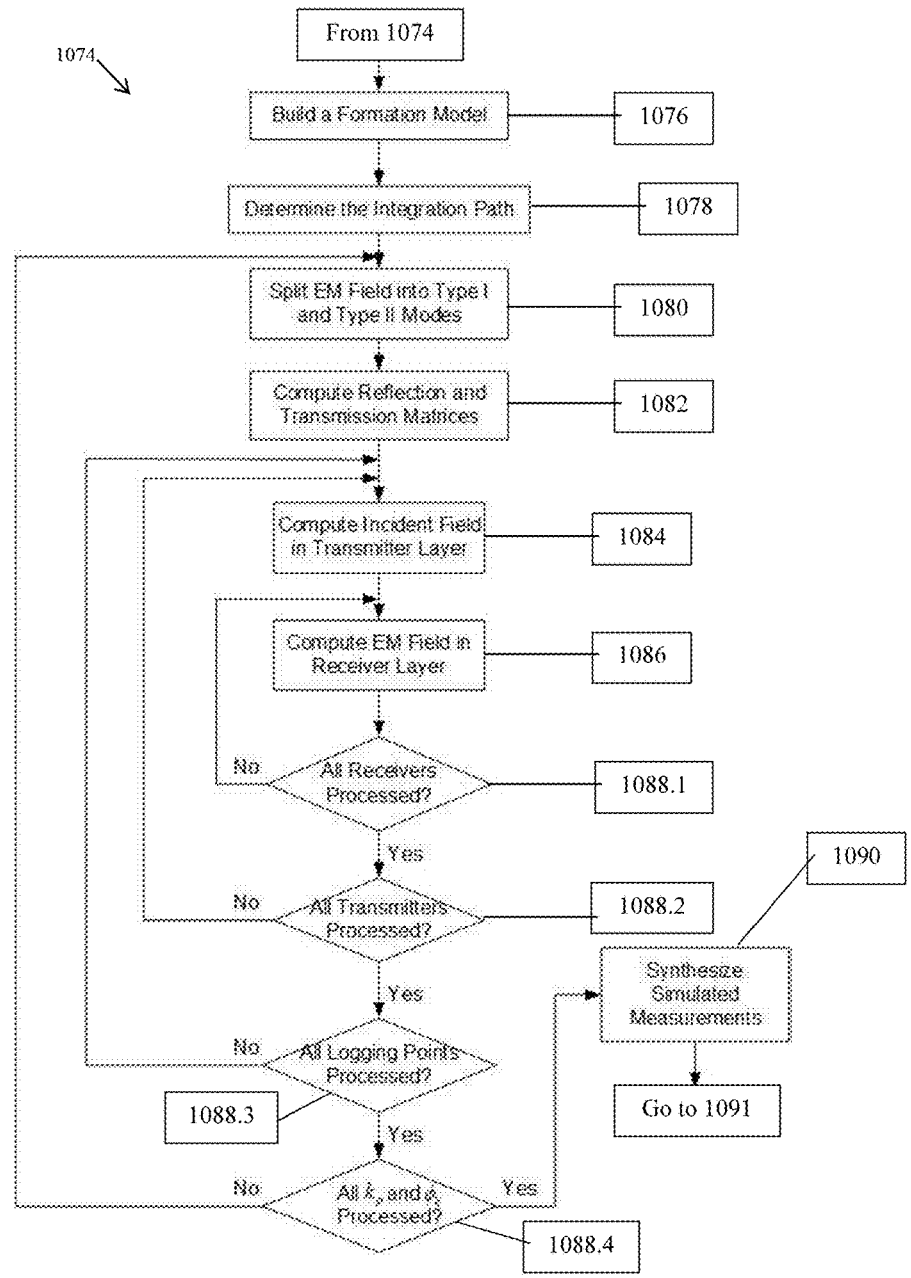

METHOD FOR DETERMINING TRIAXIAL CONDUCTIVITY WITH ARBITRARY ORIENTATION USING MULTIAXIAL ELECTROMAGNETIC MEASUREMENTS

CROSS-REFERENCE TO RELATED APPLICATIONS

This application claims the benefit of U.S. Provisional Application No. 62/094,779 filed on Dec. 19, 2014 entitled "Method for Determining Triaxial Conductivity with Arbitrary Orientation Using Multiaxial Electromagnetic Measurements", the entire contents of which is hereby incorporated by reference herein.

BACKGROUND

This disclosure relates to wellsite operations. In particular, this disclosure relates to downhole measurement, stimulation and/or fracturing techniques.

Identifying the composition of a geological formation can provide information about the likely presence or absence of hydrocarbons in a subsurface geological formation. As such, many downhole tools have been developed that aim to analyze the geological formation from within a wellbore. Electromagnetic logging tools are one type of downhole tool that may be used to measure properties of the geological formation.

Transverse isotropy, or uniaxial anisotropy, is generally encountered in subsurface formations because of thinly-layered structures or intrinsic anisotropy of sedimentary rocks. When fractures or faults are developed in formations, the resistivity of the formations can be different in all three orthogonal directions, leading to triaxial anisotropy in the formations (also called bi-axial anisotropy in optical terms in the literature).

The triaxial anisotropy can be found in formations generally considered transversely isotropic, such as shales and laminated sands. It can also happen in fairly isotropic formations, such as carbonates if the density, width, length, opening, and orientation, etc., of fractures change from place to place in the fractured zone. Examples of tri-axial related techniques are provided in U.S. Pat. Nos. 7,386,430, 6,977,021, 6,924,646, 6798708, 2014/0305692, 2013/0335092, 2012/0065889, and 2010/0256964, the entire contents of which are hereby incorporated by reference herein.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In at least one aspect, the disclosure relates to a method for determining triaxially anisotropic conductivity, detecting and characterizing fractures (e.g., natural or drilling-induced) of subsurface formations of subsurface formations including generating an initial model of the formations from multiaxial electromagnetic transimpedance measurements, the model comprising values of three conductivity components and three Euler angles in the principal coordinate system for each formation layer, and bedding dip and azimuth if the formation is of a layered structure. The computer measurements are decomposed into type I and type II components. Expected decomposed components are calculated from the initial model. The actual tool measurements are compared to the summation of the expected decomposed components. The initial model is adjusted, the expected decomposed components are recalculated and the foregoing are repeated until the difference between the actual tool measurements and the summation of the expected decomposed components falls below a selected threshold. The three derived conductivity components are used to derive the triaxiality indicator, which in turn is used to detect the presence of fractures. The three conductivity components are also used in conjunction with three Euler angles to characterize fractures.

In at least one aspect, the disclosure relates to a system and method of performing wellsite operations, such as a fracture operation, at a wellsite about a subterranean formation. The method involves, obtaining wellsite measurements by placing a downhole tool in a wellbore and using the downhole tool to acquire electromagnetic measurements of the subterranean formation, simulating the obtained wellsite measurements to determine formation parameters comprising conductivity tensors based on a formation model of the measured subterranean formation, validating the formation model by comparing the obtained wellsite measurements with the simulated wellsite measurements, generating fracture parameters and triaxiality indicators based on the validated formation model, and fracturing the subterranean formation based on the generated fracture parameters and triaxiality indicators. The method may also involve adjusting the formation model and/or evaluating fracture efficiency.

An example method includes placing a downhole tool in a wellbore in a geological formation, and using a downhole tool to obtain an apparent conductivity measurement, or an electromagnetic attenuation measurement and an electromagnetic phase shift measurement. The method also includes deriving triaxially anisotropic conductivity of a subsurface formation, deriving triaxiality indicator in order to evaluate a difference between a triaxially anisotropic bed and a transversely isotropic bed with a processor, and deriving fracture parameters in order to characterize fractures.

An example system includes a multiaxial electromagnetic measurement system; and a processor configured to derive triaxially anisotropic conductivity of a subsurface formation.

An example system includes a multiaxial electromagnetic measurement system; and a processor configured to derive triaxiality indicator in order to evaluate a difference between a triaxially anisotropic bed and a transversely isotropic bed.

An example system includes a multiaxial electromagnetic measurement system; and a processor configured to derive fracture parameters in order to characterize fractures.

A method that includes placing a downhole tool in a wellbore in a geological formation, and using the downhole tool to obtain an electromagnetic apparent conductivity measurement, or and an electromagnetic phase shift measurement is disclosed. The method also includes using a processor to derive triaxially anisotropic conductivity of a subsurface formation and/or triaxiality indicator in order to evaluate a difference between a triaxially anisotropic bed and a transversely isotropic bed with a processor, and deriving fracture parameters in order to characterize fractures.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the system and method for generating a hydraulic fracture growth pattern are described with reference to the following figures. The same numbers are used throughout the figures to reference like features and components. Various aspects of this disclosure may be better understood upon reading the following detailed description and upon reference to the drawings in which:

FIGS. 1.1-1.4 are schematic views illustrating various oilfield operations at a wellsite in accordance with one or more embodiments;

FIGS. 2.1-2.4 are schematic views illustrating various data collected by the operations of FIGS. 1.1-1.4 in accordance with one or more embodiments;

FIGS. 8.1-8.9 depict apparent conductivity of RT Scanner in an array at a frequency at 26 kHz in a three-layer formation in accordance with one or more embodiments;

FIGS. 9.1-9.6 depict ambiguity of the principal coordinate system in accordance with one or more embodiments; and FIGS. 10.1-10.2 are flow charts depicting a method of performing a fracture operation and a portion thereof, respectively, in accordance with one or more embodiments.

DETAILED DESCRIPTION

Figure 3:
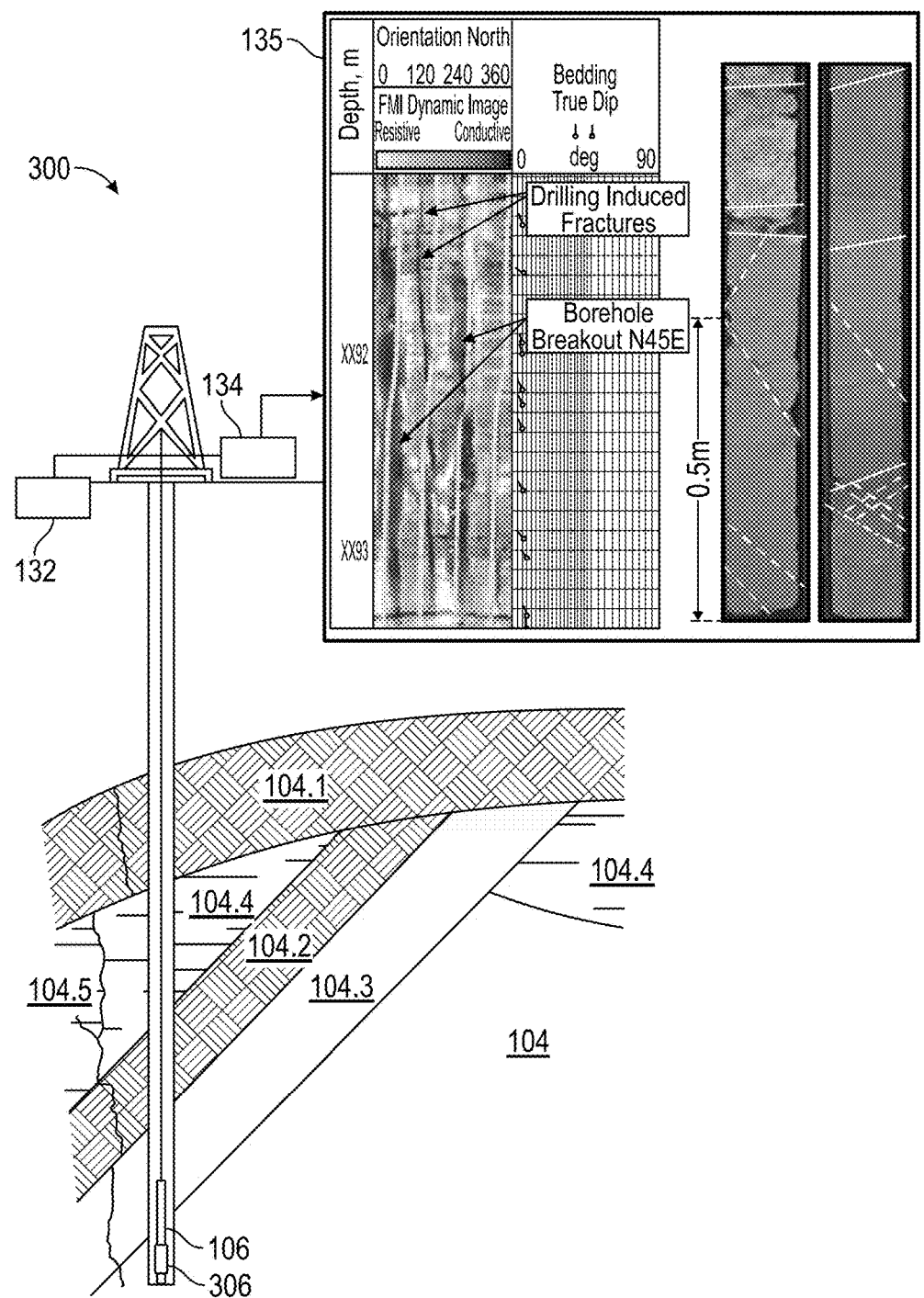
FIG. 3 is a schematic diagram depicting a logging operation and images of the formation generated therefrom in accordance with one or more embodiments.

The description that follows includes exemplary apparatuses, methods, techniques, and instruction sequences that embody techniques of the inventive subject matter. However, it is understood that the described embodiments may be practiced without these specific details.

This disclosure is generally related to the use of well logging measurements to determine the properties of subsurface rock formations. More specifically, the invention is related to a full-wave inversion method for determining the resistivity/conductivity of a layered triaxially anisotropic rock formation in which the principal axes of the resistivity/conductivity of any layer can be oriented in an arbitrary direction using multiaxial electromagnetic well logging measurements.

Described herein is a full-wave inversion method to determine a full triaxial conductivity tensor of each layer in a multi-layered medium using data acquired by a multiaxial electromagnetic measurement system. The multi-layered medium can be a sedimentary rock formation consisting of a plurality of sedimentary beds each of which can be triaxially anisotropic with an arbitrary orientation which can be different from that of other beds. All of the sedimentary beds are assumed to be parallel to one another. The orientation of the bedding plane in the borehole coordinate system is described by bedding dip and bedding azimuth, designated by $\theta$ and $\phi$. The conductivity of any bed in the multi-layered formation is described by a 3×3 tensor which can be defined by three conductivity components, i.e. $\sigma_x$, $\sigma_y$ and $\sigma_z$, and three rotation angles, i.e. $\alpha$, $\beta$, $\gamma$.

The full-wave inversion method may be used to find the bedding dip and bedding azimuth, and the six parameters of the conductivity tensor of each bed in the multi-layered formation. The full-wave inversion method can be any deterministic inversion, e.g. Gaussian-Newton method, or any probabilistic algorithm, e.g. the genetic method or simulated annealing method. The forward model of the full-wave inversion is a fast full-wave algorithm that provides a rigorous solution to the electromagnetic field in a multi-layered and triaxially anisotropic medium. From the three conductivity components determined by the inversion, the triaxiality indicator is derived in order to evaluate the difference/distance between a triaxially anisotropic bed and a transversely isotropic bed. The triaxiality indicator can serve as an indicator for the presence of fractures in sedimentary rock formations, e.g. in shales. Moreover, a method based on either an effective medium method, or a numerical simulation method is presented to infer the fracture orientation/aperture from the three conductivity components and the three rotation angles.

The full-wave inversion method described herein can be used to find the resistivity/conductivity of a layered triaxially anisotropic rock formation in which the principal axes of the resistivity/conductivity of any layer can be oriented in an arbitrary direction using multiaxial electromagnetic well logging measurements.

Oilfield Operations

FIGS. 1.1-1.4 depict various oilfield operations that may be performed at a wellsite, and FIGS. 2.1-2.4 depict various information that may be collected at the wellsite. FIGS. 1.1-1.4 depict simplified, schematic views of a representative oilfield or wellsite 100 having subsurface formation 102 containing, for example, reservoir 104 therein and depicting various oilfield operations being performed on the wellsite 100. FIG. 1.1 depicts a survey operation being performed by a survey tool, such as seismic truck 106.1, to measure properties of the subsurface formation. The survey operation may be a seismic survey operation for producing sound vibrations. In FIG. 1.1, one such sound vibration 112 generated by a source 110 reflects off a plurality of horizons 114 in an earth formation 116. The sound vibration(s) 112 may be received in by sensors, such as geophone-receivers 118, situated on the earth's surface, and the geophones 118 produce electrical output signals, referred to as data received 120 in FIG. 1.1.

In response to the received sound vibration(s) 112 representative of different parameters (such as amplitude and/or frequency) of the sound vibration(s) 112, the geophones 118 may produce electrical output signals containing data concerning the subsurface formation. The data received 120 may be provided as input data to a computer 122.1 of the seismic truck 106.1, and responsive to the input data, the computer 122.1 may generate a seismic and microseismic data output 124. The seismic data output may be stored, transmitted or further processed as desired, for example by data reduction.

FIG. 1.2 depicts a drilling operation being performed by a drilling tool 106.2 suspended by a rig 128 and advanced into the subsurface formations 102 to form a wellbore 136 or other channel. A mud pit 130 may be used to draw drilling mud into the drilling tools via flow line 132 for circulating drilling mud through the drilling tools, up the wellbore 136 and back to the surface. The drilling mud may be filtered and returned to the mud pit. A circulating system may be used for storing, controlling or filtering the flowing drilling muds. In this illustration, the drilling tools are advanced into the subsurface formations to reach reservoir 104. Each well may target one or more reservoirs. The drilling tools may be adapted for measuring downhole properties using logging while drilling tools. The logging while drilling tool may also be adapted for taking a core sample 133 as shown, or removed so that a core sample may be taken using another tool.

A surface unit 134 may be used to communicate with the drilling tools and/or offsite operations. The surface unit may communicate with the drilling tools to send commands to the drilling tools, and to receive data therefrom. The surface unit may be provided with computer facilities for receiving, storing, processing, and/or analyzing data from the operation. The surface unit may collect data generated during the drilling operation and produce data output 135 which may be stored or transmitted. Computer facilities, such as those of the surface unit, may be positioned at various locations about the wellsite and/or at remote locations.

Sensors (S), such as gauges, may be positioned about the oilfield to collect data relating to various operations as described previously. As shown, the sensor (S) may be positioned in one or more locations in the drilling tools and/or at the rig to measure drilling parameters, such as weight on bit, torque on bit, pressures, temperatures, flow rates, compositions, rotary speed and/or other parameters of the operation. Sensors (S) may also be positioned in one or more locations in the circulating system.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering analysis. The reservoir, wellbore, surface and/or processed data may be used to perform reservoir, wellbore, geological, and geophysical or other simulations. The data outputs from the operation may be generated directly from the sensors, or after some preprocessing or modeling. These data outputs may act as inputs for further analysis.

The data may be collected and stored at the surface unit 134. One or more surface units may be located at the wellsite, or connected remotely thereto. The surface unit may be a single unit, or a complex network of units used to perform the necessary data management functions throughout the oilfield. The surface unit may be a manual or automatic system. The surface unit 134 may be operated and/or adjusted by a user.

The surface unit may be provided with a transceiver 137 to allow communications between the surface unit and various portions of the current oilfield or other locations. The surface unit 134 may also be provided with or functionally connected to one or more controllers for actuating mechanisms at the wellsite 100. The surface unit 134 may then send command signals to the oilfield in response to data received. The surface unit 134 may receive commands via the transceiver or may itself execute commands to the controller. A processor may be provided to analyze the data (locally or remotely), make the decisions and/or actuate the controller. In this manner, operations may be selectively adjusted based on the data collected. Portions of the operation, such as controlling drilling, weight on bit, pump rates or other parameters, may be optimized based on the information. These adjustments may be made automatically based on computer protocol, and/or manually by an operator. In some cases, well plans may be adjusted to select optimum operating conditions, or to avoid problems.

FIG. 1.3 depicts a wireline operation being performed by a wireline tool 106.3 suspended by the rig 128 and into the wellbore 136 of FIG. 1.2. The wireline tool 106.3 may be adapted for deployment into a wellbore 136 for generating well logs, performing downhole tests and/or collecting samples. The wireline tool 106.3 may be used to provide another method and apparatus for performing a seismic survey operation. The wireline tool 106.3 of FIG. 1.3 may, for example, have an explosive, radioactive, electrical, or acoustic energy source 144 that sends and/or receives electrical signals to the surrounding subsurface formations 102 and fluids therein.

The wireline tool 106.3 may be operatively connected to, for example, the geophones 118 and the computer 122.1 of the seismic truck 106.1 of FIG. 1.1. The wireline tool 106.3 may also provide data to the surface unit 134. The surface unit 134 may collect data generated during the wireline operation and produce data output 135 which may be stored or transmitted. The wireline tool 106.3 may be positioned at various depths in the wellbore to provide a survey or other information relating to the subsurface formation.

Sensors (S), such as gauges, may be positioned about the wellsite 100 to collect data relating to various operations as described previously. As shown, the sensor (S) is positioned in the wireline tool 106.3 to measure downhole parameters which relate to, for example porosity, permeability, fluid composition and/or other parameters of the operation.

FIG. 1.4 depicts a production operation being performed by a production tool 106.4 deployed from a production unit or Christmas tree 129 and into the completed wellbore 136 of FIG. 1.3 for drawing fluid from the downhole reservoirs into surface facilities 142. Fluid flows from reservoir 104 through perforations in the casing (not shown) and into the production tool 106.4 in the wellbore 136 and to the surface facilities 142 via a gathering network 146.

Sensors (S), such as gauges, may be positioned about the oilfield to collect data relating to various operations as described previously. As shown, the sensor (S) may be positioned in the production tool 106.4 or associated equipment, such as the Christmas tree 129, gathering network, surface facilities and/or the production facility, to measure fluid parameters, such as fluid composition, flow rates, pressures, temperatures, and/or other parameters of the production operation.

While simplified wellsite configurations are shown, it will be appreciated that the oilfield or wellsite 100 may cover a portion of land, sea and/or water locations that hosts one or more wellsites. Production may also include injection wells (not shown) for added recovery or for storage of hydrocarbons, carbon dioxide, or water, for example. One or more gathering facilities may be operatively connected to one or more of the wellsites for selectively collecting downhole fluids from the wellsite(s).

It should be appreciated that FIGS. 1.2-1.4 depict tools that can be used to measure properties of an oilfield, as well as properties of non-oilfield operations, such as mines, aquifers, storage, and other subsurface facilities. Also, while certain data acquisition tools are depicted, it will be appreciated that various measurement tools (e.g., wireline, measurement while drilling (MWD), logging while drilling (LWD), core sample, etc.) capable of sensing parameters, such as seismic two-way travel time, density, resistivity, production rate, etc., of the subsurface formation and/or its geological formations may be used. Various sensors (S) may be located at various positions along the wellbore and/or the monitoring tools to collect and/or monitor the desired data. Other sources of data may also be provided from offsite locations.

The oilfield configuration of FIGS. 1.1-1.4 depicts examples of a wellsite 100 and various operations usable with the techniques provided herein. Part, or all, of the oilfield may be on land, water and/or sea. Also, while a single oilfield measured at a single location is depicted, reservoir engineering may be utilized with any combination of one or more oilfields, one or more processing facilities, and one or more wellsites.

FIGS. 2.1-2.4 are graphical depictions of examples of data collected by the tools of FIGS. 1.1-1.4, respectively. FIG. 2.1 depicts a seismic trace 202 of the subsurface formation of FIG. 1.1 taken by seismic truck 106.1. The seismic trace may be used to provide data, such as a two-way response over a period of time. FIG. 2.2 depicts a core sample 133 taken by the drilling tools 106.2. The core sample may be used to provide data, such as a graph of the density, porosity, permeability or other physical property of the core sample over the length of the core. Tests for density and viscosity may be performed on the fluids in the core at varying pressures and temperatures. FIG. 2.3 depicts a well log 204 of the subsurface formation of FIG. 1.3 taken by the wireline tool 106.3. The wireline log may provide a resistivity or other measurement of the formation at various depts. FIG. 2.4 depicts a production decline curve or graph 206 of fluid flowing through the subsurface formation of FIG. 1.4 measured at the surface facilities 142. The production decline curve may provide the production rate Q as a function of time t.

The respective graphs of FIGS. 2.1, 2.3, and 2.4 depict examples of static measurements that may describe or provide information about the physical characteristics of the formation and reservoirs contained therein. These measurements may be analyzed to define properties of the formation(s), to determine the accuracy of the measurements and/or to check for errors. The plots of each of the respective measurements may be aligned and scaled for comparison and verification of the properties.

FIG. 2.4 depicts an example of a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subsurface formation to determine characteristics thereof. Similar measurements may also be used to measure changes in formation aspects over time.

FIG. 3 is a schematic diagram depicting a measurement (e.g., logging) operation. This logging operation employs a logging tool 106 (which may be any of the tools 106.1-106.4) to measure various aspects of the subterranean formation 104. The logging tool 106 may be a triaxial induction tool having a resistivity unit 306 capable of generating electromagnetic measurements of the subterranean formation. Examples of tools with electromagnetic capabilities are provided in U.S. Pat. Nos. 6,819,110 and 8,638,103, the entire contents of which are hereby incorporated by reference herein.

The logging tool 106 may be used to generate outputs in the form of logging data which may be in the form of images of portions of the subsurface formation 104. Such imaging may detect various formation layers 104.1-104.3, faults 104.5, reservoirs 104.4, fractures, and/or other features of the subterranean formation 104.

Figure 4:
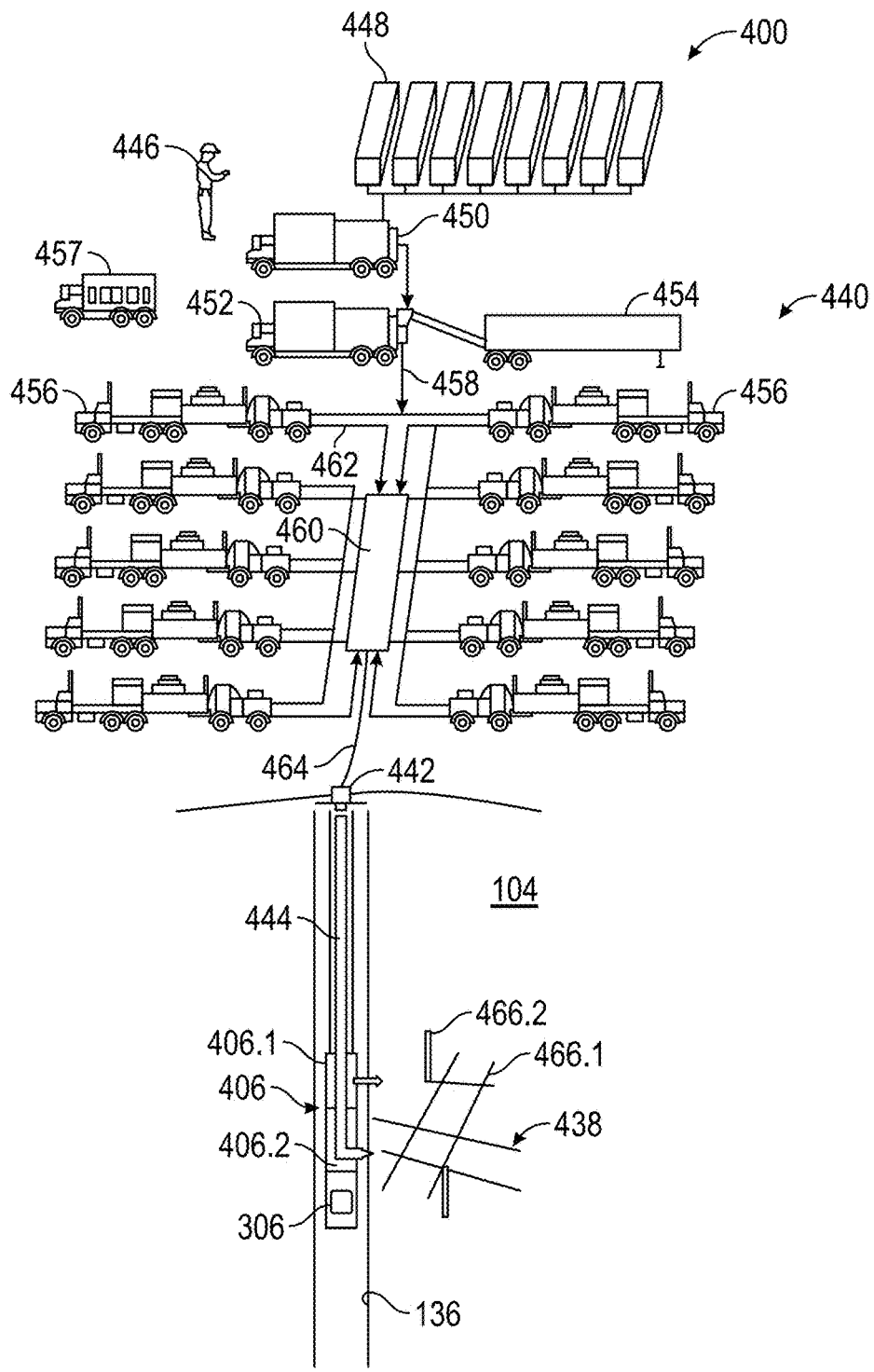
FIG. 4 is a schematic diagram of a stimulation operation in accordance with one or more embodiments.

FIG. 4 is a schematic diagram depicting a stimulation operation 400. This stimulation operation 400 employs a stimulation tool 406 deployed into the wellbore 136 to perforate and/or inject the formation 104 surrounding the wellbore 136. The stimulation tool 406 may have a perforating unit 406.1 for making perforations in the sidewall of the wellbore, an injection unit 406.2 for injecting fluid into the formation through the perforations, and the resistivity unit 306 for measuring resistivity of the formation.

A fracture network 438 extends about the wellbore 136. A pump system 440 is positioned about a wellhead 442 at a surface end of the wellbore 136 for passing fluid through tubing 444 (e.g., coiled tubing). The pump system 440 is depicted as being operated by a field operator 446 for recording maintenance and operational data and/or performing maintenance in accordance with a prescribed maintenance plan. The pumping system 440 pumps fluid from the surface to the wellbore 136 during the stimulation operation.

The pump system 440 includes a plurality of water tanks 448, which feed water to a gel hydration unit 450. The gel hydration unit 450 combines water from the tanks 448 with a gelling agent to form a gel. The gel is then sent to a blender 452 where it is mixed with a proppant from a proppant transport 454 to form a fracturing fluid. The gelling agent may be used to increase the viscosity of the fracturing fluid, and to allow the proppant to be suspended in the fracturing fluid. It may also act as a friction reducing agent to allow higher pump rates with less frictional pressure.

The fracturing fluid is then pumped from the blender 452 to the treatment trucks 456 with plunger pumps as shown by solid lines 458. Each treatment truck 456 receives the fracturing fluid at a low pressure and discharges it to a common manifold 460 (sometimes called a missile trailer or missile) at a high pressure as shown by dashed lines 462. The missile 460 then directs the fracturing fluid from the treatment trucks 456 to the wellbore 136 as shown by solid line 464. One or more treatment trucks 456 may be used to supply fracturing fluid at a desired rate. A computerized control system 457 may be employed to direct the entire pump system 440 during the fracturing operation.

Various fluids, such as conventional stimulation fluids with proppants, may be used to create fractures. Other fluids, such as viscous gels, "slick water" (which may have a friction reducer (polymer) and water) may also be used to hydraulically fracture shale gas wells. Such "slick water" may be in the form of a thin fluid (e.g., nearly the same viscosity as water) and may be used to create more complex fractures, such as multiple micro-seismic fractures detectable by monitoring.

As also shown in FIG. 4, the fracture network 438 includes fractures located at various positions around the wellbore 136. The various fractures may be natural fractures 466.1 present before injection of the fluids, or hydraulic fractures 466.2 generated about the formation 104 during injection. Stimulation operations, such as perforation and fluid injection, may be used to extend the natural fractures 466.1 to hydraulic fractures 466.2 to facilitate the flow of fluids from reservoirs into the formation. Stimulation operations may be performed at one or more location along the wellbore 136 to facilitate production as needed.

Electromagnetic Field in a Multi-Layered Medium with Triaxial Anisotropy

Stimulation (e.g., perforation and/or injection) and/or other wellsite operations (e.g., those of FIGS. 1.1-1.4 and/or 3-4) may be affected by the condition of the subterranean formation. Information gleaned from the electromagnetic measurements (e.g., those generated in FIG. 3) may provide an understanding of the formation and/or its ability to produce hydrocarbons. Such electromagnetic measurements may provide information about fractures that may be used to predict performance (e.g., efficiency) during various wellsite operations. Coaxial and multiaxial techniques may be used to generate parameters used in determining fracture parameters as is described further herein.

The frequency domain vector-wave equation for electric field E in an anisotropic medium is shown below in Equation (1):

$$\nabla \times \nabla \times E - i\omega\mu_0 \overline{\sigma} \cdot E = -\nabla \times M + i\omega\mu_0 J \quad (1)$$

In Equation (1), the electromagnetic field source can be a magnetic current, designated by M, or an electric current source, designated by J. Without loss of generality, the electromagnetic field may be excited by a magnetic current source M. The formation is assumed nonmagnetic, hence the permeability $\mu = \mu_0$; $\omega = 2\pi f$ is the angular frequency of the operation current, with f being its frequency. The time dependence is $e^{-i\omega t}$ where i is the imaginary unit, $i = \sqrt{-1}$. For the electromagnetic field in a multilayered formation, the conductivity of any bed therein is given by Equation (2):

$$\overline{\sigma} = \overline{R}_\beta^t \overline{R}_\alpha^t \overline{R}_\gamma^t \begin{bmatrix} \sigma_x & & \\ & \sigma_y & \\ & & \sigma_z \end{bmatrix} \overline{R}_\gamma \overline{R}_\alpha \overline{R}_\beta \quad (2)$$

Two coordinate systems may be employed to define the conductivity as in Equation (2), i.e. the bedding coordinate system and the principal coordinate system. The bedding coordinate system may be defined such that the xy-plane is parallel to the bedding plane, and the z-axis is along the normal to the bedding plane. The principal coordinate system is the one in which the conductivity tensor reduces to a diagonal form. In the above, $\overline{\sigma}$ is the conductivity defined in the bedding coordinate system (xyz). Symbols $\sigma_x$, $\sigma_y$ and $\sigma_z$ are the three conductivity components in the x-, y- and z-direction of the principal coordinate system. Any of the three conductivity components can be a complex number such that $\sigma_v = \sigma'_v - i\omega\varepsilon_v$, v=x, y, z, where the second term is due to the displacement current where $\varepsilon$ is the permitivity. Note that conductivity is a reciprocal of resistivity, therefore, resistivity may be used to describe the electrical property of a subsurface formation.

When the frequency is high, the contribution from the displacement current becomes negligible. Matrices $\overline{R}_\gamma$, $\overline{R}_\alpha$ and $\overline{R}_\beta$ are three elemental rotation matrices associated with Euler angles ($\gamma$, $\alpha$, $\beta$), respectively, which are given by Equations (3), (4), and (5):

$$\overline{R}_\gamma = \begin{pmatrix} \cos\gamma & \sin\gamma & 0 \\ -\sin\gamma & \cos\gamma & 0 \\ 0 & 0 & 1 \end{pmatrix} \quad (3)$$

$$\overline{R}_\alpha = \begin{bmatrix} \cos\alpha & 0 & \sin\alpha \\ 0 & 1 & 0 \\ -\sin\alpha & 0 & \cos\alpha \end{bmatrix} \quad (4)$$

$$\overline{R}_\beta = \begin{bmatrix} \cos\beta & \sin\beta & 0 \\ -\sin\beta & \cos\beta & 0 \\ 0 & 0 & 1 \end{bmatrix} \quad (5)$$

Figure 5:
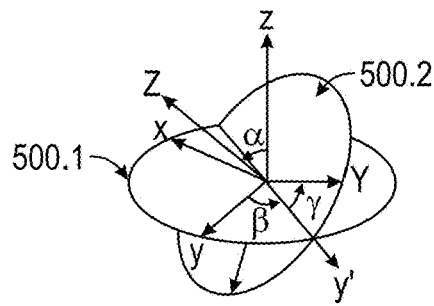
FIG. 5 depicts rotation between principal coordinate system and bedding coordinate system in accordance with one or more embodiments.

It has been shown that the domains of $\gamma$, $\alpha$, and $\beta$ can be reduced to [0,90°), [0,360°) and [0,180°), respectively. With the above three rotation matrices, the two coordinate systems can be rotated from one to the other. FIG. 5 is a schematic diagram depicting a bedding coordinate system 500.1. This diagram describes the rotation between a principal coordinate system 500.2 and the bedding coordinate system 500.1. Here, xyz is the bedding coordinate system 500.1; XYZ is the principal coordinate system 500.2. The line indexed by y' is the line of the node.

More than one type of rotation operation can be used to rotate the principal coordinate system to the bedding coordinate system. The rotation as shown in Equations (3)-(5) is called z-y'-z" rotation in the literature. This type of rotation is compatible to that commonly used for the transversely isotropic formation. When $\sigma_x = \sigma_y$, $\overline{R}_\gamma$ becomes redundant, $\overline{R}_\alpha$ and $\overline{R}_\beta$ reduce to nothing but the two elemental rotations associated with the crossbed dip $\theta$ $\alpha$ and azimuth $\varphi$ $\beta$ of the bed. However, this does not imply that the algorithm is limited to this particular type of rotation. In actuality, both the forward and inversion methods described in this inversion applies to any rotation that is selected to associate the two coordinate systems.

For the sake of clarification, $\sigma_x$, $\sigma_y$, $\sigma_z$, $\alpha$, $\beta$, and $\gamma$ are not indexed by the order number of bed. They are not necessarily constant across the whole formation and can change from bed to bed. However, they are assumed invariant within each bed in all directions.

In a homogeneous medium, the electric field can be written as below in Equation (6):

$$E(r) = \int_{-\infty}^{\infty}\int_{-\infty}^{\infty} dk_x dk_y (\hat{h}_I^\pm, \hat{h}_{II}^\pm) b_{\eta,0}^\pm e^{iK_z^\pm(z-z')} e^{ik_s\cdot(r_s-r'_s)} \quad (6)$$

where $r_s = x\hat{x} + y\hat{y}$ and $r'_s = x'\hat{x} + y'\hat{y}$ are the transverse coordinates of the field and source points, respectively in the bedding coordinate system; z and z' are their axial coordinates, respectively; $k_s = k_x\hat{x} + k_y\hat{y}$ designates transverse wave numbers; $K_z^\pm$ consists of two axial wave numbers, $K_z^\pm$=diag$(k_{z,I}^\pm, k_{z,II}^\pm)$ where subscripts I and II denote type I and type II modes, respectively. The $k_{z,I}^\pm$ and $k_{z,II}^\pm$ can be found by solving the dispersion equation as given by Equation (7) and Equation (8):

$$\det[\overline{K}^2 + i\omega\mu_0\overline{\sigma}] = 0, \quad (7)$$

$$\overline{K} = \begin{pmatrix} 0 & -k_z & k_y \\ k_z & 0 & -k_x \\ -k_y & k_x & 0 \end{pmatrix}. \quad (8)$$

The plus and minus signs designate upgoing and downgoing waves, respectively; $b_{\eta,0}^\pm$ is the field magnitude determined by the source in Equation (9):

$$b_{\eta,0}^\pm = -\frac{iI_m l}{4\pi^2}\begin{pmatrix} +\lambda_I^\pm \langle \hat{h}_I^\pm, s_{\eta,I}^\pm \rangle \\ -\lambda_{II}^\pm \langle \hat{h}_{II}^\pm, s_{\eta,II}^\pm \rangle \end{pmatrix}. \quad (9)$$

In Equation (9), $s_{\eta,I}^\pm = s_\eta|_{k_z = k_{z,I}^\pm}$ and $s_{\eta,II}^\pm = s_\eta|_{k_z = k_{z,II}^\pm}$ are the source terms in the spectral domain, l is length, and $I_m$ is the current. Here, η stands for the source orientation, η=x, y, z. The following Equations (10)-(12) may be readily found:

$$s_x = ik_z\hat{y} - ik_y\hat{z} \quad (10)$$

$$s_y = ik_x\hat{z} - ik_z\hat{x} \quad (11)$$

$$s_z = ik_y\hat{x} - ik_x\hat{y}. \quad (12)$$

These Equations (10)-(12) correspond to a magnetic dipole directed in x-, y-, and z-direction, respectively in the bedding coordinate system. Unit vectors $\hat{h}_I^\pm$ and $\hat{h}_{II}^\pm$ are the type I and type II modes of the electric field, and $\lambda_I^\pm$ and $\lambda_{II}^\pm$ are their associated coefficients. The two wave modes $\hat{h}_I^\pm$ and $\hat{h}_{II}^\pm$ can be found by noting the following in Equations (13) and (14):

$$\mathrm{adj}[\overline{K}^2 + i\omega\mu_0\overline{\sigma}]|_{k_z=k_I^\pm} = \mathrm{tr}[\overline{K}^2 + i\omega\mu_0\overline{\sigma}]|_{k_z=k_I^\pm}\hat{h}_I^\pm\hat{h}_I^\pm \quad (13)$$

$$\mathrm{adj}[\overline{K}^2 + i\omega\mu_0\overline{\sigma}]|_{k_z=k_{II}^\pm} = \mathrm{tr}[\overline{K}^2 + i\omega\mu_0\overline{\sigma}]|_{k_z=k_{II}^\pm}\hat{h}_{II}^\pm\hat{h}_{II}^\pm \quad (14)$$

The two associated coefficients $\lambda_I^\pm$ and $\lambda_{II}^\pm$ are given by the following Equations (15)-(17):

$$\lambda_I^\pm = \frac{\mathrm{adj}[\overline{K}^2 + i\omega\mu_0\overline{\sigma}]|_{k_z=k_I^\pm}}{\Delta[\overline{K}^2 + i\omega\mu_0\overline{\sigma}]|_{k_z=k_I^\pm}} \quad (15)$$

$$\lambda_{II}^\pm = \frac{\mathrm{adj}[\overline{K}^2 + i\omega\mu_0\overline{\sigma}]|_{k_z=k_{II}^\pm}}{\Delta[\overline{K}^2 + i\omega\mu_0\overline{\sigma}]|_{k_z=k_{II}^\pm}}, \text{ and where:} \quad (16)$$

$$\Delta[\overline{K}^2 + i\omega\mu_0\overline{\sigma}]|_{k_z=k_I^\pm} = i\omega\mu\sigma_{zz}(k_I^\mp - k_I^\pm)(k_I^\pm - k_{II}^+)(k_I^\pm - k_{II}^-) \quad (17)$$

$$\Delta[\overline{K}^2 + i\omega\mu_0\overline{\sigma}]|_{k_z=k_{II}^\pm} = i\omega\mu\sigma_{zz}(k_{II}^\pm - k_I^+)(k_{II}^\pm - k_I^-)(k_{II}^\pm - k_{II}^\mp)$$

In the above, $\sigma_{zz}$ is an element of $\overline{\sigma}$ in the bedding coordinate system, i.e. $\sigma_{zz}=(\overline{\sigma})_{i=3,j=3}$.

Figure 6:
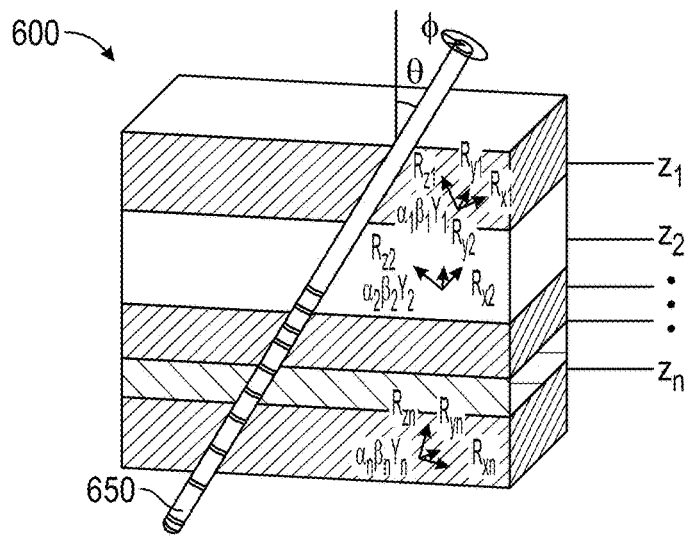
FIG. 6 depicts a multi-layered and triaxially anisotropic formation model in accordance with one or more embodiments.

FIG. 6 is a schematic diagram depicting a multi-layered and triaxially anisotropic formation model 600. In this model, the conductivity of each layer $z_1$-$z_n$ is described by a tensor conductivity 650 with an arbitrary orientation. The three conductivity components $\sigma_x$, $\sigma_y$, $\sigma_z$, and three Euler angles α, β, and γ that define the tensor conductivity can vary from bed to bed. The bedding dip and bedding azimuth are θ and φ, respectively.

In a multilayered formation with horizontal interfaces $z_1$, $z_2$, ... $z_N$, as shown in FIG. 6, the electric field in layer m (bounded by $z_{m-1}$ and $z_m$) can be written as Equation (18):

$$E_m(r) = \int_{-\infty}^\infty \int_{-\infty}^\infty dk_x dk_y \left[(\hat{h}_{I,m}^\pm, \hat{h}_{II,m}^\pm) + (\hat{h}_{I,m}^\mp, \hat{h}_{II,m}^\mp)\overline{Q}_m^\pm(z)\right]u_m^\pm(z)e^{ik_s\cdot(r_s-r_s')} \quad (18)$$

The incident wave $u_m^\pm$ and charge $\overline{Q}_m^\pm$ in layer m, which may be a receiver layer, are found by matching continuity conditions across bed boundaries, which yields:

$$\overline{Q}_{(m)\pm}^\pm = \overline{R}_{m,m\pm1} + \overline{T}_{m\pm1,m}\overline{Q}_{(m\pm1)\mp}^\pm[\overline{I} - \overline{R}_{m\pm1,m}\overline{Q}_{(m\pm1)\mp}^\pm]^{-1}\overline{T}_{m,m\pm1} \quad (19)$$

$$u_{(m\pm1)\mp}^\pm = [\overline{I} - \overline{R}_{m\pm1,m}\overline{Q}_{(m\pm1)\mp}^\pm]^{-1}\overline{T}_{m,m\pm1}u_{(m)\pm}^\pm \quad (20)$$

In the above, $\overline{R}_{m,m\pm1}$ and $\overline{T}_{m,m\pm1}$ are the local reflection and transmission matrices, respectively, between layer m and m±1, and are found by matching boundary conditions. Notations (m)+ and (m)− (see, e.g., Zhang, G. J., G. L. Wang, and H. M. Wang, 1999, Application of Novel Basis Functions in a Hybrid Method Simulation of the Response of Induction Logging in Axisymmetrical Stratified Media: Radio Science, 34, no. 1, 19-26, 1999) designate upper and lower boundaries, respectively, of layer m. In layer s, or source layer, may be a transmitter layer described as follows:

$$u_s^+(z) = e^{iK_z^+(z-z')}b_{\eta,0,s}^+ + e^{iK_z^+(z-z_{s-1})}v_{(s)-}^+ \quad (21)$$

$$u_s^-(z) = e^{iK_z^-(z-z')}b_{\eta,0,s}^- + e^{iK_z^-(z-z_s)}v_{(s)+}^-, \quad (22)$$

where $$v_{(s)-}^+ = [\overline{I} - \overline{Q}_{(s)-}^- e^{-i\overline{K}_{z,s}^- h_s}\overline{Q}_{(s)+}^+ e^{+i\overline{K}_{z,s}^+ h_s}]^{-1} \overline{Q}_{(s)-}^- [b_{\eta,(s)-}^- + e^{-i\overline{K}_{z,s}^- h_s}\overline{Q}_{(s)-}^- b_{\eta,(s)+}^+] \quad (23)$$

$$v_{(s)+}^- = [\overline{I} - \overline{Q}_{(s)+}^+ e^{+i\overline{K}_{z,s}^+ h_s}\overline{Q}_{(s)-}^- e^{-i\overline{K}_{z,s}^- h_s}]^{-1} \overline{Q}_{(s)+}^+ [b_{\eta,(s)+}^+ + e^{i\overline{K}_{z,s}^+ h_s}\overline{Q}_{(s)-}^- b_{\eta,(s)-}^-] \quad (24)$$

In the above, $h_s$ is the thickness of the source layer, $h_s = z_s - z_{s-1}$. With equations 18-24, and the knowledge of $\overline{Q}_1^- = 0$ and $\overline{Q}_{M+1}^+ = 0$, $u_m^\pm$ and $\overline{Q}_m^\pm$ in all layers can be found recursively.

The 2D integral in Equation (18) can be evaluated in the cylindrical coordinates of wave number k. For a field point in the xz-plane:

$$E_m(r) = \int_0^\infty k_\rho dk_\rho \int_0^{2\pi} d\phi_k E_m(k_\rho, \phi_k; z, z')e^{ik_\rho L\sin\theta\cos\phi_k} \quad (25)$$

where L is the distance between the source and the field point; θ is the bedding dip; $\phi_k$ is the angle made by $k_s$ and the $k_x$ axis. The integrations over $\phi_k$ and $k_\rho$ can be evaluated using the numerical integration schemes in the literature. Once the expression of electric field is found, the magnetic field H can be found with the Faraday law, viz. as shown below:

$$H_m(r) = \frac{1}{i\omega\mu_0}\nabla \times E_m(r) \quad (26)$$

Equation (26) gives the magnetic field in the bedding coordinate system. The magnetic field in the tool/borehole coordinate system can be found with the following equation:

$$\overline{H}_m^{Tool}(r) = \overline{R}_\theta \overline{R}_\phi \overline{H}_m(r) \overline{R}_\phi^t \overline{R}_\theta^t \quad (27)$$

In the above equation, $\overline{H}_m(r)$ is the tensor of magnetic field in the bedding coordinate system; $\overline{H}_m^{Tool}(r)$ is its counterpart in the tool/borehole coordinate system. The two matrices $\overline{R}_\theta$ and $\overline{R}_\phi$ designate the rotations associated with bedding dip θ and bedding azimuth φ, respectively, which are given as follows:

$$\overline{R}_\theta = \begin{pmatrix} \cos\theta & 0 & -\sin\theta \\ 0 & 1 & 0 \\ \sin\theta & 0 & \cos\theta \end{pmatrix} \quad (28)$$

$$\overline{R}_\phi = \begin{pmatrix} \cos\phi & \sin\phi & 0 \\ -\sin\phi & \cos\phi & 0 \\ 0 & 0 & 1 \end{pmatrix} \quad (29)$$

The above model also applies to homogeneous formations where there are no bed boundaries. This can be done by simply setting bedding dip θ and bedding azimuth φ to zero. The magnetic field tensor $\overline{H}_m^{Tool}(r)$ is used to synthesize the measurement to be provided by a given electromagnetic tool. For a generic triaxial induction tool consisting of one transmitter and one receiver, the measurement is apparent conductivity, which is given by:

$$\overline{\sigma}_a = \overline{K} \circ \overline{H}_m^{Tool}(r) \quad (30)$$

where $\overline{K}$ is a constant sensitivity-factor matrix and ∘ is a symbol for a Hadamard product, or element-wise matrix product. For an example triaxial induction downhole tool, such as an RT Scanner, $\overline{H}_m^{Tool}(r)$ is a superposition of the magnetic field at the main receiver and the bucking receiver.

Figure 7:
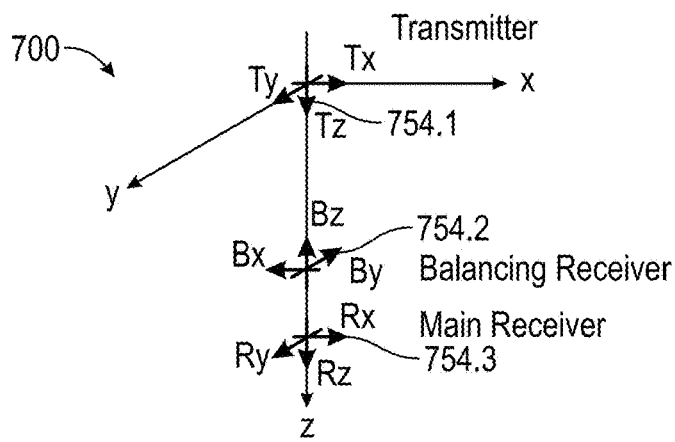
FIG. 7 depicts a configuration of a triaxial array of an RT Scanner in accordance with one or more embodiments.

FIG. 7 is a schematic diagram depicting a configuration of a triaxial array 700 of one array of an RT Scanner. The RT Scanner may be a resistivity unit 306 and/or a downhole tool, such as the logging tool 106 of FIG. 3 and/or the stimulation tool of FIG. 4. The RT Scanner may be a multi-array triaxial induction tool with mutually orthogonal and collocated transmitter and receiver coils.

The RT Scanner has a transmitter consisting of three orthogonal coils 754.1-754.3 carrying an alternating current that induces eddy current in the surrounding formation. The transmitter has main and bucking receivers each consisting of three orthogonal coils to detect the voltage due to the induced eddy current. The measured voltages are, therefore, a function of the formation conductivity and may be calibrated to the apparent conductivity as follows (see, e.g., Wang, et al., 2006, Determining Anisotropic Formation Resistivity at Any Relative Dip Using a Multiarray Triaxial Induction Tool: Annual Technical Conference and Exhibition, Society of Petroleum Engineers, SPE-103113-MS, 2006):

$$\overline{\sigma}_a = \begin{pmatrix} \sigma_{a,xx} & \sigma_{a,xy} & \sigma_{a,xz} \\ \sigma_{a,yx} & \sigma_{a,yy} & \sigma_{a,yz} \\ \sigma_{a,zx} & \sigma_{a,zy} & \sigma_{a,zz} \end{pmatrix} \quad (31)$$

FIGS. 8.1-8.9 are graphs showing apparent conductivity of an RT Scanner with a 72 in (182.88 cm) array at a frequency of 26 kHz in a three-layer formation with the bedding dip θ and azimuth φ being 60° and 150°, respectively. These graphs show three rows corresponding to transmitter coils in x-, y-, and z-direction, respectively, as shown in FIG. 7. The three columns correspond to receiver coils in x-, y-, and z-direction, respectively. The graphs plot apparent conductivity ($\sigma_a$) (y-axis in mS/m) versus distance (MD)(ft).

The Rx, Ry, Rz, and Euler angles α, β and γ of the formation of FIGS. 8.1-8.9 are listed in Table 1 below:

TABLE 1

Parameters of the three-layer formation (θ = 60°, φ = 150°)

| | $R_x$ (ohm·m) | $R_y$ (ohm·m) | $R_z$ (ohm·m) | α | β | γ | Thickness (ft) |
|---|---|---|---|---|---|---|---|
| Bed 1 | 10 | 10 | 20 | 10° | 50° | 0 | Infinity |
| Bed 2 | 1 | 2 | 5 | 45° | 120° | 60°(0°) | 10 |
| Bed 3 | 10 | 10 | 20 | 60° | 150° | 0 | Infinity |

The graphs 8.1-8.9 depict the apparent conductivity curves when the γ angle of the middle layer is 0°, in comparison to the apparent conductivity curves when the γ angles of the middle layer is 60°. There is shown a difference between the two sets of curves. Such a difference demonstrates that the third Euler angle γ may not be eligible for triaxial conductivity. In one example (U.S. Patent Publication No. US20100230095A1), the solution space is described by Rx, Ry, Rz and two Euler angles, i.e., α, and β.

Inversion Method for Determining Conductivity Tensor from Electromagnetic Measurements In at least some cases (e.g., as shown by FIGS. 8.1-8.9), the base solution above may need further analysis, have potential error, and/or may fail to address certain parameters. An inversion method may be used to consider triaxial anisotropy and/or other characteristics of the formation. The inversion problem is formulated as minimizing the following objective function:

$$C(x) = D[d(x) - d^{OBS}] + R(\lambda; x) \quad (32)$$

In Equation (32), x designates the unknown model to be determined with inversion:

$$x = (\sigma_x^t, \sigma_y^t, \sigma_z^t, z^t, \gamma^t, \alpha^t, \beta^t, \theta, \phi)^t \quad (33)$$

where $\sigma_x$, $\sigma_y$, and $\sigma_z$ are each a vector of three conductivity components in all beds, respectively, $\sigma_x = (\sigma_{x,i})$, $\sigma_y = (\sigma_{y,i})$, $\sigma_z = (\sigma_{z,i})$ i=1, ..., N+1; γ, α and β are each a vector of Euler angles in all layers respectively, $\gamma = (\gamma_i)$, $\alpha = (\alpha_i)$, $\beta = (\beta_i)$, i=1, ..., N+1; z is a vector of position of all bed boundaries, $z = (z_i)$, i=1, ..., N; θ and φ are bedding dip and bedding azimuth respectively.

In homogenous formations, it may be assumed there are no bed boundaries, so it is not necessary to invert for θ and φ. Accordingly, the unknown vector x reduces to $x = (\sigma_x, \sigma_y, \sigma_z, \gamma, \alpha, \beta)^t$. Here, $\sigma_x$, $\sigma_y$, $\sigma_z$, α, β, and γ are the three conductivity components and three Euler angles of the homogeneous formation. The first term on the right hand side of the Equation (32) is the measure of distance between the measured data $d^{OBS}$ and the simulated data d(x). The distance is understood as the p-norm distance combined with data weighting. The commonly used distance measure is either 1-norm or 2-norm.

The additional term R(λ;x) is for regularization purpose often used in deterministic inversions, where vector λ consists of regularization parameters that can be determined in advance or with the progress of inversion. The unknown model x is found once the objective function reaches its minimum:

$$x_T = \underset{x}{\mathrm{argmin}}\, C(x) \quad (34)$$

The inversion problem can be solved with either a deterministic method, e.g. the Gaussian-Newton method, or a probabilistic method, e.g. the simulated method or genetic method. Without loss of generality, in the following, an example using the Gauss-Newton method is presented.

Shown in Table 2 is a 4-layer example with triaxial anisotropy:

TABLE 2

The initial model for the inversion on the synthetic data of the 4-layer model.

| | $\sigma_x$ (mS/ m) | $\sigma_y$ (mS/ m) | $\sigma_z$ (mS/ m) | $\alpha$ (deg) | $\beta$ (deg) | $\gamma$ (deg) | z (ft) | $\theta$ (deg) | $\phi$ (deg) |
|---|---|---|---|---|---|---|---|---|---|
| Layer 1 | 20 | 50 | 10 | 90 | 150 | 45 | −4 | 5 | 150 |
| Layer 2 | 50 | 10 | 5 | 200 | 75 | 20 | 0 | | |
| Layer 3 | 5 | 20 | 30 | 5 | 30 | 60 | 5 | | |
| Layer 4 | 100 | 50 | 10 | 75 | 110 | 30 | | | |

As indicated by Table 2, $\sigma_x$, $\sigma_y$, $\sigma_z$, $\alpha$, $\beta$, and $\gamma$ may be different from layer to layer. The synthetic data of the simulated RT Scanner in the model is generated with the forward method introduced in the previous section, and is contaminated with 2.5% uniformly distributed multiplicative noise. The contaminated data is then fed to the inversion as a mock-up of field data to test the inversion. The inversion problem is formulated as a quadratic minimization problem and is solved with the Gauss-Newton method, a deterministic algorithm. The physical constraints were implemented with a non-linear transformation method. The regularization parameter is chosen with the multiplicative regularization method.

More technical details of an example Gauss-Newton method can be found in the paper by Habashy and Abubakar, 2004, A General Framework for Constraint Minimization for the Inversion of Electromagnetic Measurements, Progress In Electromagnetics Research, PIER 46, 265-312, 2004, the entire contents of which is hereby incorporated by reference herein.

The initial model used in the inversion is described in Table 3:

TABLE 3

A 4-layer model with triaxial conductivity anisotropy.

| | $\sigma_x$ (mS/ m) | $\sigma_y$ (mS/ m) | $\sigma_z$ (mS/ m) | $\alpha$ (deg) | $\beta$ (deg) | $\gamma$ (deg) | z (ft) | $\theta$ (deg) | $\phi$ (deg) |
|---|---|---|---|---|---|---|---|---|---|
| Layer 1 | 5 | 5 | 5 | 50 | 50 | 50 | −3 | 50 | 50 |
| Layer 2 | 5 | 5 | 5 | 50 | 50 | 50 | 1 | | |
| Layer 3 | 5 | 5 | 5 | 50 | 50 | 50 | 4 | | |
| Layer 4 | 5 | 5 | 5 | 50 | 50 | 50 | | | |

Symbols $\sigma_x$, $\sigma_y$ and $\sigma_z$ are the three conductivity components in the principal coordinate system. Symbols $\alpha$, $\beta$, and $\gamma$ are the three Euler angles associated with the z–y'–z" rotation. Listed in the third column from right are the positions of bed boundary. Symbols $\theta$ and $\phi$ are bedding dip and bedding azimuth, respectively.

The reconstructed model from the inversion is shown in Table 4.

TABLE 4

The reconstructed model with the inversion on the synthetic data of the 4-layer model

| | $\sigma_x$ (mS/ m) | $\sigma_y$ (mS/ m) | $\sigma_z$ (mS/ m) | $\alpha$ (deg) | $\beta$ (deg) | $\gamma$ (deg) | z (ft) | $\theta$ (deg) | $\phi$ (deg) |
|---|---|---|---|---|---|---|---|---|---|
| Layer 1 | 19.9985 | 50.0230 | 10.0733 | 90.3564 | 151.5731 | 45.3472 | −4.0084 | 4.9872 | 149.2553 |
| Layer 2 | 4.9816 | 49.8913 | 9.9559 | 96.2905 | 146.9375 | 18.9664 | 0.0011 | | |
| Layer 3 | 5.0411 | 30.0595 | 19.9249 | 94.0259 | 0.3573 | 87.4176 | 4.9954 | | |
| Layer 4 | 99.8254 | 49.8332 | 9.9860 | 75.0353 | 110.7507 | 29.8054 | | | |

This table shows that $\sigma_x$, $\sigma_y$, $\sigma_z$, $\alpha$, $\beta$, and $\gamma$ of layers 1 and 4, as well as bed boundaries, dip and azimuth match with the true model.

As shown in the example of Table 4, $\sigma_x$, $\sigma_y$, $\sigma_z$, $\alpha$, $\beta$, and $\gamma$ in layers 2 and 3 seemingly do not agree with the their true counterparts. It can be shown that such parameters are feasible solutions. This can be done by substituting $\sigma_x$, $\sigma_y$, $\sigma_z$, $\alpha$, $\beta$, and $\gamma$ of the two layers into Equation (2) and then comparing the resultant $\bar{\sigma}$ in the bedding coordinate system with that obtained with those of the true model. This superficial disagreement may be due to the ambiguity of the principal coordinate system. It can be shown that there are six principal coordinate systems, each of which is associated with a permutation of $\sigma_x$, $\sigma_y$, $\sigma_z$. All of the six permutations give the same $\bar{\sigma}$ in the bedding coordinate system.

The six principal coordinate systems are depicted in FIGS. 9.1-9.6. FIGS. 9.1-9.6 show the coordinate systems with the $\sigma_1$, $\sigma_2$, $\sigma_3$ in various configurations. These figures demonstrate ambiguity of the principal coordinate system. As shown by these figures, the same diagonal conductivity tensor $\bar{\sigma}=\text{diag}\{\sigma_1,\sigma_2,\sigma_3\}$ has six different forms due to the six feasible orientations of the three principal axes. In addition to the original form of $\bar{\sigma}=\text{diag}\{\sigma_1,\sigma_2,\sigma_3\}$, the other five forms are $\bar{\sigma}=\text{diag}\{\sigma_1,\sigma_3,\sigma_2\}$ $\bar{\sigma}=\text{diag}\{\sigma_2,\sigma_1,\sigma_3\}$, $\bar{\sigma}=\text{diag}\{\sigma_2,\sigma_3,\sigma_1\}$, $\bar{\sigma}=\text{diag}\{\sigma_3,\sigma_1,\sigma_2\}$, and $\bar{\sigma}=\text{diag}\{\sigma_3,\sigma_2,\sigma_1\}$, respectively.

To remove the influence of the ambiguity of the principal coordinate system on the inversion, the three reconstructed conductivity components $\sigma_x$, $\sigma_y$, $\sigma_z$ of every layer can be rearranged in the descending order or ascending order so that the conductivity from different layers is comparable. Rearranging $\sigma_x$, $\sigma_y$, and $\sigma_z$ is straightforward, but not the three Euler angles. In principle, the three angles can be found algebraically. The three angles can also be found by solving the following nonlinear equation:

$$\bar{\sigma}(\sigma^P; e^P) = \bar{\sigma}(\sigma^{INV}; e^{INV}) \qquad (35)$$

In the above, $\sigma^{INV}$ is a triplet of $\sigma_x$, $\sigma_y$, and $\sigma_z$ found with the inversion for a given layer; $e^{INV}=(\alpha^{INV},\beta^{INV},\gamma^{INV})$ is a triplet of the three Euler angles of the same layer from the inversion; $\sigma^P$ is also a triplet of $\sigma_x$, $\sigma_y$, and $\sigma_z$, but reordered in the descending order or ascending order; $e^P=(\alpha^P,\beta^P,\gamma^P)$ is a triplet of the three Euler angles corresponding to the reordered conductivity triplet $\sigma^P$, which are to be found by solving Equation (35). Note that Equation (35) can also be converted to a minimization problem such that:

$$e^P = \underset{e^P}{\arg\min}\, D[\bar{\sigma}(\sigma^P; e^P) - \bar{\sigma}(\sigma^{INV}; e^{INV})] \qquad (36)$$

where D is a measure of distance between two matrices of $\bar{\sigma}(\sigma^P; e^P)$ and $\bar{\sigma}(\sigma^{INV}; e^{INV})$.

Table 5 shows the new results of layers 2 and 3 after rearranging $\sigma_x$, $\sigma_y$, and $\sigma_z$ in an order the same as that of the true model.

TABLE 5

Reordered conductivity components and the corresponding Euler angles for layers 2 and 3.

| | $\sigma_x$ (mS/m) | $\sigma_y$ (mS/m) | $\sigma_z$ (mS/m) | α (deg) | β (deg) | γ (deg) |
|---|---|---|---|---|---|---|
| Layer 2 | 49.8913 | 9.9559 | 4.9816 | 199.9459 | 74.6208 | 18.7351 |
| Layer 3 | 5.0411 | 19.9249 | 30.0595 | 4.7818 | 33.0743 | 57.3737 |

This table shows that the new Euler angles of layer 2 agree with their true values. The agreement of those in layer 3 is not as good as that of those in layer 2, but is still acceptable considering its low conductivity compared to the two neighboring layers. The relatively large difference of layer 3 suggests that the parameters in low conductivity zone found with inversion is susceptible to data noise.

Another way to remove the influence of the ambiguity of the principal coordinate system is to impose a constraint for the order of $\sigma_x$, $\sigma_y$, and $\sigma_z$ in the inversion in Equation (35). Without loss of generality, assume that the imposed order is $\sigma_x \geq \sigma_y \geq \sigma_z$, then the new inversion will become $$\bar{\sigma} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix} \quad (37)$$

subject to $\sigma_x \geq \sigma_y \geq \sigma_z$ for each layer.

In the above, $\bar{\sigma}$ is described by three conductivity components, $\sigma_x$, $\sigma_y$, and $\sigma_z$, in the principal coordinate system and three Euler angles α, β, and γ, as in Equation (2). It is these six parameters that are determined with the inversion in the example above. In another manner, $\bar{\sigma}$ can be found directly by inverting for its compositional elements in the bedding coordinate system as follows:

$$\bar{\sigma} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix} \quad (37)$$

Considering the symmetry of $\bar{\sigma}$, there are six parameters to be determined, which are $\sigma_{xx}$, $\sigma_{xy}$, $\sigma_{xz}$, $\sigma_{yy}$, $\sigma_{yz}$, and $\sigma_{zz}$. Even though the number of unknowns remains the same, there are some benefits to invert for $\bar{\sigma}$ directly. For instance, it is assumed there is no ambiguity of the principal coordinate system. If needed, the conductivity components, $\sigma_x$, $\sigma_y$, and $\sigma_z$ can be found by solving an eigenvalue problem once $\bar{\sigma}$ is determined with the inversion. Then, the Euler angles can be found by solving a non-linear equation, given by:

$$\bar{\sigma}(\sigma^{EIG}; e) = \bar{\sigma} \quad (38)$$

where $\sigma^{EIG}$ is a triplet of $\sigma_x$, $\sigma_y$, and $\sigma_z$, found from the eigenvalue problem; e is a triplet of Euler angles to be solved for. Equation (38) is similar to Equation (35), with the sole difference being that $\bar{\sigma}$ on the right hand side is from the inversion directly, instead of from Equation (2). It is also possible to find $\sigma_x$, $\sigma_y$, and $\sigma_z$ and three Euler angles simultaneously by solving Equation (38) if $\sigma_x$, $\sigma_y$, and $\sigma_z$ are treated as unknowns.

Determining Triaxiality and Fracture Orientation/Aperture from Reconstructed Conductivity Tensor From the reconstructed $\sigma_x$, $\sigma_y$, and $\sigma_z$, the following indicator can be derived:

$$TRIAXI = \min\left\{\frac{\sigma_{max}}{\sigma_{mid}}, \frac{\sigma_{mid}}{\sigma_{min}}\right\} - 1 \quad (39)$$

where $\sigma_{max} = \max\{\sigma_x, \sigma_y, \sigma_z\}$, $\sigma_{min} = \min\{\sigma_x, \sigma_y, \sigma_z\}$, and $\sigma_{mid} = \{\sigma_x, \sigma_y, \sigma_z\} \backslash \{\sigma_{min}, \sigma_{max}\}$. The triaxiality indicator can also be defined as the logarithmic value of the smaller one of the two ratios in the curly bracket of Equation (39) as follows:

$$TRIAXI = \ln\min\left\{\frac{\sigma_{max}}{\sigma_{mid}}, \frac{\sigma_{mid}}{\sigma_{min}}\right\} \quad (40)$$

Thus, the larger TRIAXI is, the larger the difference between any two of the three conductivity components. When TRIAXI=0, two components are equal to each other, the formation reduces to transversely isotropic. Therefore, the smaller TRIAXI is, the more similar the formation is to a transversely isotropic formation; the larger TRIAXI is, the more different the formation is from a transversely isotropic formation. In some formations, e.g. in shales, TRIAXI can be used to indicate the presence of fractures.

The reconstructed $\sigma_x$, $\sigma_y$, and $\sigma_z$ as well as the three Euler angles may also be used to characterize the dip θ and orientation (azimuth) φ of fault, or fracture/fracture network. To this end, $\sigma_x$, $\sigma_y$, $\sigma_z$, α, β, and γ are considered as the parameters that describe an effective medium of the fault, or fracture/fracture network. The relationship between $\sigma_x$, $\sigma_y$, $\sigma_z$, α, β, and γ, and conductivity, dip, orientation, and opening (for conductive filling) of fault, or fracture/fracture network can be established with some existing methods, e.g. the one described by Habashy and Abubakar, 2007, A Generalized Material Averaging Formulation for Modeling of The Electromagnetic Fields, J. of Electromagnetic Waves and Appl., Vol. 21, No. 9, 1145-1159, 2007, or the one by Saevik et al., "Electrical Conductivity of Fractured Media: A Computational Study of the Self-Consistent Method", presented at SEG International Exposition and 82th Annual Meeting, Las Vegas, Nev., Nov. 4-9, 2012. These are referred to as an effective medium method.

Such characterizations can also be established by a numerical method, such as described by Wang et al., "Triaxial Induction Tool Response in Dipping and Crossbedded Formations", presented at SEG International Exposition and 84th Annual Meeting, Denver, Colo., Oct. 26-31, 2014, and/or the forward algorithm described herein. Assuming a single fracture is infinitely extending in a homogeneous and transversely isotropic formation, it can be described by the following set of parameters:

$$x^F = \{d, \sigma^F, \theta^F, \phi^F\} \quad (41)$$

where, d, $\sigma^F$, $\theta^F$, and $\phi^F$ are the fracture opening, conductivity, dip and azimuth, respectively. The homogeneous formation can be described by the following set of parameters:

$$x^H = \{\sigma_h, \sigma_v, \theta^H, \phi^H\} \quad (42)$$

Once the relationship is found, it can be used to estimate the fracture parameters. If an effective medium method is used, estimating fracture parameters is equivalent to solving the following non-linear problem:

$$\bar{\sigma}(x^F, x^H) = \bar{\sigma} \quad (43)$$

where $\bar{\sigma}$ is given by Equation (2), and $\bar{\sigma}(x^F, x^H)$ is the one estimated with the effective medium method. It is noted that there are six independent elements in $\bar{\sigma}$. For the problem to be solvable, the parameters of the background homogeneous medium may need to be determined in advance.

If the numerical simulation method is used, estimating fracture parameters is equivalent to solving the following non-linear problem:

$$\bar{\sigma}^a(x^F,x^H)=\bar{\sigma}^a(\sigma,e) \quad (44)$$

In the above, $\sigma=\{\sigma_x,\sigma_y,\sigma_z\}$, $e=\{\alpha,\beta,\gamma\}$; the matrix $\bar{\sigma}^a$ is the apparent conductivity from a triaxial induction tool, e.g. RT Scanner. $\bar{\sigma}^a$ can be from one array, one frequency, or from a plurality of arrays, or a plurality of frequencies. Equation (44) can also be formulated as a minimization problem given by:

$$\{x^F, x^H\} = \arg\min_{\{x^F,x^H\}} D[\bar{\sigma}^a(x^F, x^H) - \bar{\sigma}^a(\sigma, e)] \quad (45)$$

In the above D is the measure of distance between the two apparent conductivity matrices. If both $x^F$ and $x^H$ are unknown; or if the parameters are already determined in another way, the problem may be reduced to solving for $x^F$, that is:

$$x^F = \arg\min_{x^F} D[\bar{\sigma}^a(x^F, x^H) - \bar{\sigma}^a(\sigma, e)] \quad (46)$$

In the above, the problem of estimating fracture parameters is formulated in the bedding coordinate system. Once the fracture dip and orientation are found, further operation is needed to convert them to the tool/borehole coordinate system. The problem can also be formulated in the tool/borehole system directly. To this end, the conductivity tensor in the tool/borehole coordinate system is found first with the following rotation operation:

$$\bar{\sigma}^{Tool}=\bar{R}_\theta\bar{R}_\phi\bar{\sigma}\bar{R}_\phi'\bar{R}_\theta'. \quad (47)$$

Then using the same methods as presented in the above for $\bar{\sigma}$, i.e. the effective medium method, or the numerical simulation method, the fracture parameters can be found with $\bar{\sigma}^{Tool}$.

In the above, a triaxial induction tool, such as an RT Scanner, and its measurements, such as apparent conductivity $\bar{\sigma}^a$, may be used to describe the methodology of the invention. This by no means implies that the methods herein are limited to a triaxial induction tool. The invention can be applied to any wireline and logging-while-drilling electromagnetic tool that provides a full, a nearly full, or a partially full tensor-type measurement, such as PERISCOPE™ commercially available from SCHLUMBERGER TECHNOLOGY CORPORATION™ at www.slb.com.

Fracture Operations

FIGS. 10.1 and 10.2 are flow charts depicting a method 1000 of performing fracture operations and a portion of the method 1000, respectively. The method 1000 involves generating 1070 tool measurements, such as resistivity logs as shown in FIG. 3 (see also FIG. 1.1-4 and related text), building 1072 an initial model (see, e.g., FIG. 6 and related text), and simulating 1074 the wellsite measurements in the model.

The simulating 1074 is shown in greater detail in the flowchart of FIG. 10.2. The simulating 1074 involves building 1076 a formation model as shown in FIG. 6, determining 1078 an integration path of the model using Equation (25), splitting 1080 an electromagnetic field of the model into Type I and Type II modes using Equation (6), and computing 1082 reflection and transmission matrices using Equations (19) and (20). The simulating continues with computing 1084 incident field in transmitter layer using Equations (21)-(24), and computing 1086 an electromagnetic field in a receiver layer using Equation (19) and (20).

Portions of the simulating may be repeated as shown based on whether all receivers 1088.1, transmitters 1088.2, logging points 1088.3, and/or Kp and $\phi$ 1088.4, are processed. Once processed, the simulated measurements may be synthesized 1090 using Equations (27)-(30).

Referring back to FIG. 10.1, once the simulated measurements are generated and simulated by 1074 (shown in FIG. 10.2), the method 1000 continues by comparing 1091 the wellsite measurements of 1070 with the simulated measurements of 1074. If a difference between such measurements is above a given threshold 1092, the model may be adjusted 1094 and 1072-1092 repeated until the difference is below the threshold 1092. Once confirmed, the model may be used to compute 1096 triaxiality indicators using Equations (39) and (40) and solving 1098 for fracture parameters using Equations (41)-(47).

Based on this information, various wellsite operations, such as fracture operations, may be performed, and/or efficiency and/or performance of such operations may be evaluated. For example, knowing the fracture dimensions may affect where and how to perforate and/or inject fluid into the formation. These and other operations may be performed (see, e.g., FIGS. 1.1-1.4 and 3,4).

Examples of fracture operations and/or simulations are available in Jia et al., "Inversion for Tilted Triaxial Conductivity in Dipping Layered Formations, Antennas and Propagation & USNC/URSI National Radio Science Meeting," IEEE Int'l Symposium, Jul. 19-24, 2015, and Wang et al., "Fracture Detection Using the Conductivity Triaxiality Index," SPE 175111-MS, SPE Annual Technical Conference and Exhibition, 28-30 September, Houston, Tex., USA, Sep. 28-30, 2015, the entire contents of which are hereby incorporated by reference herein.

Part or all of the methods herein may be performed in any order and/or repeated as desired. While the methods described herein are shown with respect to specific tool configurations and specific processes, various combinations of the features disclosed herein may be provided.

The above operations can be performed by a processor in communication with a tangible, non-transitory, computer readable medium have stored thereon computer instructions to instruct the processor to perform one or more of the above operations, combinations of the above operations, or the like.

Validation

The resulting models and measurements (simulated or actual) generated herein may be validated by comparison with other techniques. For example, techniques for electromagnetic measurements may be performed to confirm the measurements generated herein are within a threshold value. Examples of techniques may include: PCT Application Nos. WO2013191749A1 and WO2011/123379A1; U.S. Pat. No. 3,014,177; US20050256645A1; US20080215243A1; US20100230095A1; and US20120065889A1, the entire contents of which are hereby incorporated by reference herein.

Additional examples are provided in Kriegshäuser et al., "*A New Multicomponent Induction Logging Tool to Resolve*

Anisotropic Formations," Transactions of the SPWLA 41st Annual Logging Symposium, Paper D (2000); Barber et al., "*Determining Formation Resistivity In The Presence of Invasion*," SPE 90526, presented at the SPE Annual Technical Conference and Exhibition, Houston, Tex., Sep. 26-29, 2004; Rosthal et al., "*Field Test Results of an Experimental Fully-Triaxial Induction Tool*," Transactions of the SPWLA 44th Annual Logging Symposium, Paper QQ (2003); Hou et al., "*Real-time Borehole Correction For a New Multicomponent Array Induction Logging Tool in OBM Wells*," Transactions of the SWPLA 42th Annual Logging Symposium, Paper PPP (2012); Wang et al., "*Triaxial Induction Tool Response in Dipping and Crossbedded Formations*", presented at SEG International Exposition and 84$^{th}$ Annual Meeting, Denver, Colo., Oct. 26-31, 2014; Torquato, "*Random Heterogeneous Media: Microstructure and Improved Bounds on Effective Properties*," Appl. Mech. Rev. Vol. 44, No. 2, 1991; Moskow et al., "*A Finite Difference Scheme for Elliptic Equations with Rough Coefficients Using a Cartesian Grid Nonconforming to Interfaces,*" *SIAM Journal of Numerical Analysis,* Vol. 36, 442-464, 1999; Davydycheva et al., "*An Efficient Finite-Difference Scheme for Electromagnetic Logging in 3D Anisotropic Inhomogeneous Media*", Geophysics, Vol. 68, No. 5, 2003; Habashy and Abubakar, "*A Generalized Material Averaging Formulation for Modeling of Electromagnetic Fields*". J. of Electromagnetic. Waves and Appl., Vol. 21, No. 9, 1145-1159, 2007; Saevik et al., "Electrical Conductivity of Fractured Media: A Computational Study of the Self-Consistent Method", presented at SEG International Exposition and 82$^{th}$ Annual Meeting, Las Vegas, Nev., Nov. 4-9, 2012. The techniques herein show that it is possible to establish a relationship between the orientation, density, and aperture of fractures with the six parameters of a triaxial conductivity tensor.

One or more specific embodiments of the present disclosure are described herein. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The preceding description has been presented with reference to some embodiments. Persons skilled in the art and technology to which this disclosure pertains will appreciate that alterations and changes in the described structures and/or methods of operation can be practiced without meaningfully departing from the principle, and scope of this application. For example, while the system(s) and/or method(s) presented herein were described with specific reference to certain wellsite operations, such as stimulation and/or fracturing, it will be appreciated that the system and method may likewise apply to other wellsite operations, such as producing. Moreover, while a limited number of realizations were used as examples, it should be understood that any number of realizations may be performed and assessed. Accordingly, the foregoing description should not be read as pertaining to the precise structures and workflows described and shown in the accompanying drawings, but rather should be read as consistent with and as support for the following claims, which are to have their fullest and fairest scope. Various combinations of part or all of the techniques provided herein may be performed.

Although example assemblies, methods, systems have been described herein, the scope of coverage of this patent is not limited thereto. On the contrary, this patent covers every method, apparatus, and article of manufacture fairly falling within the scope of the appended claims either literally or under the doctrine of equivalents. The present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

It should be noted that in the development of any such actual embodiment, or numerous implementation, specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the embodiments used/disclosed herein can also include some components other than those cited.

In the description, each numerical value should be read once as modified by the term "about" (unless already expressly so modified), and then read again as not so modified unless otherwise indicated in context. Also, in the description, it should be understood that any range listed or described as being useful, suitable, or the like, is intended that values within the range, including the end points, is to be considered as having been stated. For example, "a range of from 1 to 10" is to be read as indicating possible numbers along the continuum between about 1 and about 10. Thus, even if specific data points within the range, or even no data points within the range, are explicitly identified or refer to a few specific ones, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention. All references cited herein are incorporated by reference into the current application in their entirety.

Although a few example embodiments have been described in detail above, those skilled in the art will readily appreciate that many modifications are possible in the example embodiments without materially departing from the system and method for performing wellbore stimulation operations. Accordingly, all such modifications are intended to be included within the scope of this disclosure as defined in the following claims. In the claims, means-plus-function clauses are intended to cover the structures described herein as performing the recited function and structural equivalents and equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function

We claim:

1. A method of performing a fracture operation at a wellsite about a subterranean formation, the method comprising:
    obtaining wellsite measurements by placing a downhole tool in a wellbore and using the downhole tool to obtain electromagnetic measurements of the subterranean formation;
    simulating the obtained wellsite measurements to determine formation parameters comprising conductivity tensors based on a formation model of the measured subterranean formation;
    validating the formation model by comparing the obtained wellsite measurements with the simulated wellsite measurements;
    generating fracture parameters and triaxiality indicators based on the validated formation model; and
    fracturing the subterranean formation based on the generated fracture parameters and triaxiality indicators.

2. The method of claim 1, wherein the downhole tool is a multiaxial electromagnetic tool.

3. The method of claim 1, wherein the obtaining comprises generating multiaxial transimpedance by inducing a multiaxial electromagnetic field about the subterranean formation at a plurality of axial spacings and frequencies.

4. The method of claim 1, wherein the obtained wellsite measurements further comprise at least one of electromagnetic apparent conductivity, an electromagnetic attenuation measurement, an electromagnetic phase shift measurement, an apparent conductivity, and combinations thereof.

5. The method of claim 1, wherein the validating comprises confirming a difference between the wellsite measurements and the simulated wellsite measurements is within a selected threshold.

6. The method of claim 5, further comprising adjusting the formation model and repeating the simulating and validating until the difference is within the selected threshold.

7. The method of claim 1, wherein the simulating comprises determining an integration path for the integral representation of an electromagnetic field in the formation model, splitting an electromagnetic field of the formation model into type I and type II modes, computing reflection and transmission matrices of the electromagnetic field, generating incident fields in a transmitter layer of the electromagnetic field, and generating an electromagnetic field in a receiver layer of the matrices.

8. The method of claim 7, further comprising after processing receivers, transmitters, logging points, and wave numbers and angles, synthesizing the simulated measurements.

9. The method of claim 1, wherein the formation model comprises a multi-layered and triaxially anisotropic formation model.

10. The method of claim 1, wherein the fracture parameters comprise fracture dip, fracture azimuth, fracture conductivity, and fracture opening, and wherein the formation model comprises values of three conductivity components in the principal coordinate system and three Euler angles for each formation layer, and bedding dip and azimuth.

11. The method of claim 10, wherein the generating the fracture parameters comprises solving a non-linear equation using the three conductivity components and the three Euler angles.

12. The method of claim 10, further comprising generating the Euler angles by one of solving a non-linear equation to find the new Euler angles corresponding to the three conductivity components rearranged in a selected order, and generating the new Euler angles algebraically.

13. The method of claim 10, wherein the generating fracture parameters comprises computing two ratios of the three conductivity components, deriving the triaxiality indicator using the two ratios, and using the triaxiality indicator to detect the presence of fractures.

14. The method of claim 10, wherein the deriving the triaxiality indicator comprises computing two ratios of the three conductivity components.

15. The method of claim 14, wherein the generating the triaxial indicator comprises deriving electromagnetic induction measurements by one of measuring induced voltages in each of a plurality of triaxial receivers and measuring at least one of phase shift and amplitude attenuation in a plurality of triaxial receiver pairs.

16. A method of logging a wellbore penetrating a subterranean formation, the method comprising:
    deploying a downhole tool in the wellbore, the downhole tool comprising at least one multiaxial electromagnetic transmitter and at least one multiaxial electromagnetic receiver;
    obtaining wellsite measurements by acquiring electromagnetic measurements of the subterranean formation at a plurality of axial spacings and frequencies using the downhole tool;
    generating an initial formation model from the electromagnetic measurements, the formation model comprising values of three conductivity components in a principal coordinate system, three Euler angles for each formation layer, and bedding dip and azimuth of layers in the formation model;
    simulating the obtained wellsite measurements based on the initial formation model;
    generating fracture parameters by deriving triaxiality indicators based on the three conductivity components and three Euler angles of the initial formation model; and
    fracturing the subterranean formation based on the generated fracture parameters and derived triaxiality indicators.

17. The method of claim 16, further comprising comparing the obtained wellsite measurements with the simulated wellsite measurements, determining a difference therebetween, adjusting the initial model, and repeating the simulating and the comparing until a difference therebetween is below a selected threshold.

18. The method of claim 17, further comprising validating the formation model by repeating the simulating until the difference is below the selected threshold, and performing the generating fracture parameters based on the validated formation model.

19. A method of performing a fracture operation at a wellsite about a subterranean formation, the method comprising:
- obtaining formation measurements with a downhole tool;
- generating an initial model of the subterranean formation from the obtained formation measurements, the initial model comprising values of three conductivity components in a principal coordinate system and three Euler angles for each formation layer, and bedding dip and azimuth of layers in the formation model;
- decomposing the obtained formation measurements into type I and type II components;
- calculating expected decomposed components of the obtained formation measurements from the initial model;
- comparing the obtained formation measurements made at a plurality of axial spacings and frequencies to a summation of expected decomposed components to calculate a difference therebetween;
- adjusting the initial model and recalculating the difference until the difference falls below a selected threshold;
- rearranging the three conductivity components in a selected order, and computing the new Euler angles;
- deriving a triaxiality indicator from the three conductivity components of the adjusted model, and using the triaxiality indicator to detect the presence of fractures; and
- generating fracture parameters comprising fracture dip, fracture azimuth, and fracture opening, by solving a non-linear equation based on the three conductivity components and the three Euler angles.

* * * * *